United States Patent
Hirota

(10) Patent No.: US 8,982,897 B2
(45) Date of Patent: Mar. 17, 2015

(54) DATA BLOCK OUTPUT APPARATUS, COMMUNICATION SYSTEM, DATA BLOCK OUTPUT METHOD, AND COMMUNICATION METHOD

(71) Applicant: Fujitsu Limited, Kawasaki-shi (JP)

(72) Inventor: Masaki Hirota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/722,573

(22) Filed: Dec. 20, 2012

(65) Prior Publication Data

US 2013/0235878 A1 Sep. 12, 2013

(30) Foreign Application Priority Data

Mar. 8, 2012 (JP) ................. 2012-052033

(51) Int. Cl.
*H04L 12/56* (2006.01)
*H04L 12/861* (2013.01)
*H04L 7/00* (2006.01)
*H04L 12/863* (2013.01)
*H04J 3/06* (2006.01)

(52) U.S. Cl.
CPC *H04L 49/90* (2013.01); *H04L 7/00* (2013.01); *H04L 47/6215* (2013.01); *H04J 3/0682* (2013.01); *H04J 3/0667* (2013.01)
USPC ........................................ 370/412

(58) Field of Classification Search
USPC .......... 370/375, 378, 386–388, 412–419, 503
See application file for complete search history.

(56) References Cited

U.S. PATENT DOCUMENTS

| | | | |
|---|---|---|---|
| 6,912,225 B1 * | 6/2005 | Kohzuki et al. ............... | 370/412 |
| 7,613,114 B2 * | 11/2009 | Iwata et al. .................... | 370/235 |
| 7,916,760 B2 * | 3/2011 | Fujimoto et al. .............. | 370/516 |
| 2003/0095551 A1 * | 5/2003 | Gotoh et al. ............... | 370/395.3 |
| 2004/0114516 A1 | 6/2004 | Iwata | |
| 2004/0125815 A1 * | 7/2004 | Shimazu et al. .............. | 370/411 |
| 2006/0187836 A1 * | 8/2006 | Frey et al. ..................... | 370/235 |

FOREIGN PATENT DOCUMENTS

JP 2002-016637 1/2002

* cited by examiner

*Primary Examiner* — Frank Duong
(74) *Attorney, Agent, or Firm* — Fujitsu Patent Center

(57) ABSTRACT

A data block output apparatus includes a first queue that stores data blocks of first traffic; a second queue that stores data blocks of second traffic and is read preferentially over the first queue; a monitoring unit that monitors for occurrence of data blocks read out of the second queue after reading of a data block from the first queue is completed; and a control unit that controls a data block interval between completion of reading of one data block in the first traffic and a start of reading of a next data block in the first traffic when occurrence frequency of the data blocks read out of the second queue after the reading of one data block from the first queue is completed is equal to or higher than a predetermined value.

14 Claims, 24 Drawing Sheets

DATA BLOCK OUTPUT APPARATUS, COMMUNICATION SYSTEM, DATA BLOCK OUTPUT METHOD, AND COMMUNICATION METHOD

CROSS-REFERENCE TO RELATED APPLICATION

This application is based upon and claims the benefit of priority of the prior Japanese Patent Application No. 2012-052033, filed on Mar. 8, 2012 in the Japanese Patent Office, the entire contents of which are incorporated herein by reference.

FIELD

The present invention relates to a data block output apparatus, communication system, data block output method, and communication method which output predetermined packets on a priority basis.

BACKGROUND

A transmission network which connects bases used in long-distance communications and the like has conventionally been constructed using apparatuses which are based on time division multiplexing (hereinafter abbreviated to TDM (Time Division Multiplexing)) technology such as SONET/SDH (Synchronous Optical NETwork/Synchronous Digital Hierarchy). Frequency synchronization among plural stations connected via the TDM network has been performed through clock recovery from "0" and "1" signals on the SONET/SDH physical layer. On the other hand, recent transmission networks, which are packet communication networks using the IP (Internet Protocol) and the like, are often constructed using devices, such as routers and switches, which use packet technology.

Frequency/time synchronization systems for packet communication networks include the NTP (Network Time Protocol) and IEEE 1588 PTP (Precision Time Protocol). IEEE 1588, which has the potential capability for high-accuracy time synchronization in milliseconds, is planned to be used, for example, for time synchronization and the like among cellular base stations.

FIG. 1 is a diagram illustrating an example of a communication system which uses a packet-based frequency/time synchronization system. The communication system illustrated in FIG. 1 is a cell phone network system and includes a cellular-station side apparatus, a base station (denoted by BS in FIG. 1) and plural rely devices adapted to relay communications between the cellular-station side apparatus and base station. Furthermore, the communication system illustrated in FIG. 1 uses IEEE 1588 as a frequency/time synchronization system, and a master apparatus (hereinafter simply referred to as the master) is installed on the side of the cellular station while slave apparatuses are installed on the side of individual base stations (hereinafter simply referred to as slaves).

As illustrated in FIG. 1, in the packet-based frequency/time synchronization system, frequency/time synchronization is performed as special synchronization messages are exchanged between the master and a slave. The synchronization message contains a sender or receiver time stamp. The slave calculates transfer time between the master and slave based on the time stamp contained in the synchronization message from the master, thereby performs frequency/time synchronization, and provides the synchronized time or clock to the base station and the like.

FIG. 2 is a diagram illustrating a mechanism for calculating an amount of time offset according to IEEE 1588. The time at which the master sends a synchronization message (Sync) is designated as t1 and the time at which the slave receives the synchronization message (Sync) is designated as t2. Also, the time at which the slave sends a synchronization message (Delay_Req) is designated as t3 and the time at which the master receives the synchronization message (Delay_Req) is designated as t4. In this case, the slave calculates the time offset using Eq. (1) below. However, it is assumed that transfer times between the master and slave are equal between both directions. Using the time offset found according to Eq. (1), the slave modifies the time managed by the slave.

$$\text{Time offset} = \{(t2-t1)-(t4-t3)\}/2 \qquad \text{Eq. (1)}$$

[Patent document 1] Japanese Patent Laid-Open No. 2002-16637

When a packet network which relays communications between the master and slave is made up of rely devices such as switches and routers the rely devices relay user data traffic in addition to synchronization messages. Consequently, user data traffic and synchronization messages may sometimes merge together in a rely device by being inputted through different ports of the rely device and outputted through a same port. When a synchronization message merges with user data traffic, if the user data is already in the process of being read out, the synchronization message waits its turn to be read out until the reading of the user data is completed (see, for example, reference numeral 500 in FIG. 1).

A delay time experienced by the synchronization message as a result of the merge with the user data is difficult to avoid even if the rely device performs QoS (Quality of Service) processing. For example, even if the synchronization message is set at the highest class in terms of QoS, if a low-class packet is already being read on the arrival of the synchronization message, the synchronization message is not read until the reading of the packet is completed. This will result in a delay.

Hereinafter, the merging of a synchronization message and traffic of another packet (e.g., a user packet) on a rely device will be referred to as a conflict. Also, a packet and traffic which conflict with a synchronization message will be referred to as a conflicting packet and conflicting traffic, respectively. Also, a delay in the transfer of a synchronization message caused by a conflict will be referred to as a conflict delay.

FIG. 3 is a diagram for explaining variations in forward delay time of a synchronization message. The timing with which a conflict occurs on a rely device as well as packet length of conflicting traffic vary from case to case, and consequently conflict delay time varies as well. For example, the larger the size of a conflicting packet being read when a synchronization message arrives, the longer the conflict delay time.

Since the conflict delay time varies depending on the situation, the transfer times (forward delay time; t2−t1 and t4−t3 described above; and so forth) of synchronization messages between the master and slave, which contain the conflict delay time and are found by the slave, also vary depending on the situation. For example, the longer the conflict delay time, the longer the forward delay time. Consequently, there is dispersion in the values of time offset found from the transfer times of synchronization messages between the master and slave using Eq. (1). This results in degradation of time synchronization accuracy. Such variation in forward delay is known as PDV (Packet Delay Variation).

FIG. 4 is a diagram illustrating examples of delay distributions of synchronization messages. FIG. 4 illustrates a delay distribution G1 of synchronization messages when conflicting traffic occupies a narrow band and a delay distribution G2 of synchronization messages when conflicting traffic occupies a wide band. As illustrated in FIG. 4, the transfer times of synchronization messages between the master and slave become discrete due to PDV (see G1 and G2). As can be seen from the fact that the delay distribution G2 is more discrete than the delay distribution G1, the degree of discreteness depends on the band of conflicting traffic. In FIG. 4, the delay distribution G2 of synchronization messages when conflicting traffic occupies a wide band contains a smaller number of synchronization messages at and around transfer times at which there are no conflict than the delay distribution G1 of synchronization messages when conflicting traffic occupies a narrow band. That is, with increases in the band of conflicting traffic, a maximum value of delays increases as well, and the number of conflict-free synchronization messages decreases. The conflict-free synchronization messages are synchronization messages which are read without waiting for reading of any other packet of a low priority class in an output queue to be completed, i.e., synchronization messages without a conflict delay.

Even when conflicting traffic occupies a wide band, if a predetermined number of conflict-free synchronization messages can be secured, it is possible to reduce impacts of delay variation during relaying by using the transfer times gained from the conflict-free synchronization messages and thereby improve synchronization accuracy. Therefore, to improve synchronization accuracy on the slave, a predetermined number of conflict-free synchronization messages can be secured without regard to network usage. Since conflict-free synchronization messages are synchronization messages without a conflict delay, to secure a predetermined number of conflict-free synchronization messages, delays of synchronization messages can be reduced.

Incidentally, although time synchronization has predominantly been described above, frequency synchronization, which is performed based on the transfer times of synchronization messages between the master and slave as in the case of time synchronization, encounters problems similar to those of time synchronization.

SUMMARY

One aspect of the present invention is a data block output apparatus including:
a first queue that stores data blocks of first traffic;
a second queue that stores data blocks of second traffic and is read preferentially over the first queue; and
a control unit that controls a data block interval between completion of reading of one data block in the first traffic and a start of reading of a next data block in the first traffic.

Another aspect of the present invention is a communication system including: a first node; and a second node located upstream along first traffic, wherein
the first node includes:
a first queue that stores data blocks of the first traffic;
a second queue that stores data blocks of second traffic and is read preferentially over the first queue;
a control unit that controls a data block interval between completion of reading of one data block in the first traffic and a start of reading of a next data block in the first traffic; and a sending unit that sends the interval controlled by the control unit to the second node, and
the second node includes:
a third queue that stores the data blocks of the first traffic;
a receiving unit that receives the interval from the first node; and
a reading unit that reads data blocks out of the third queue such that a data block interval of the first traffic is equal to or larger than the interval received by the receiving unit.

The object and advantage of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of the present invention will be described below with reference to the drawings. However, configurations of the embodiments described below are exemplary and not intended to limit the present invention.

<First Embodiment>

Figure 5:
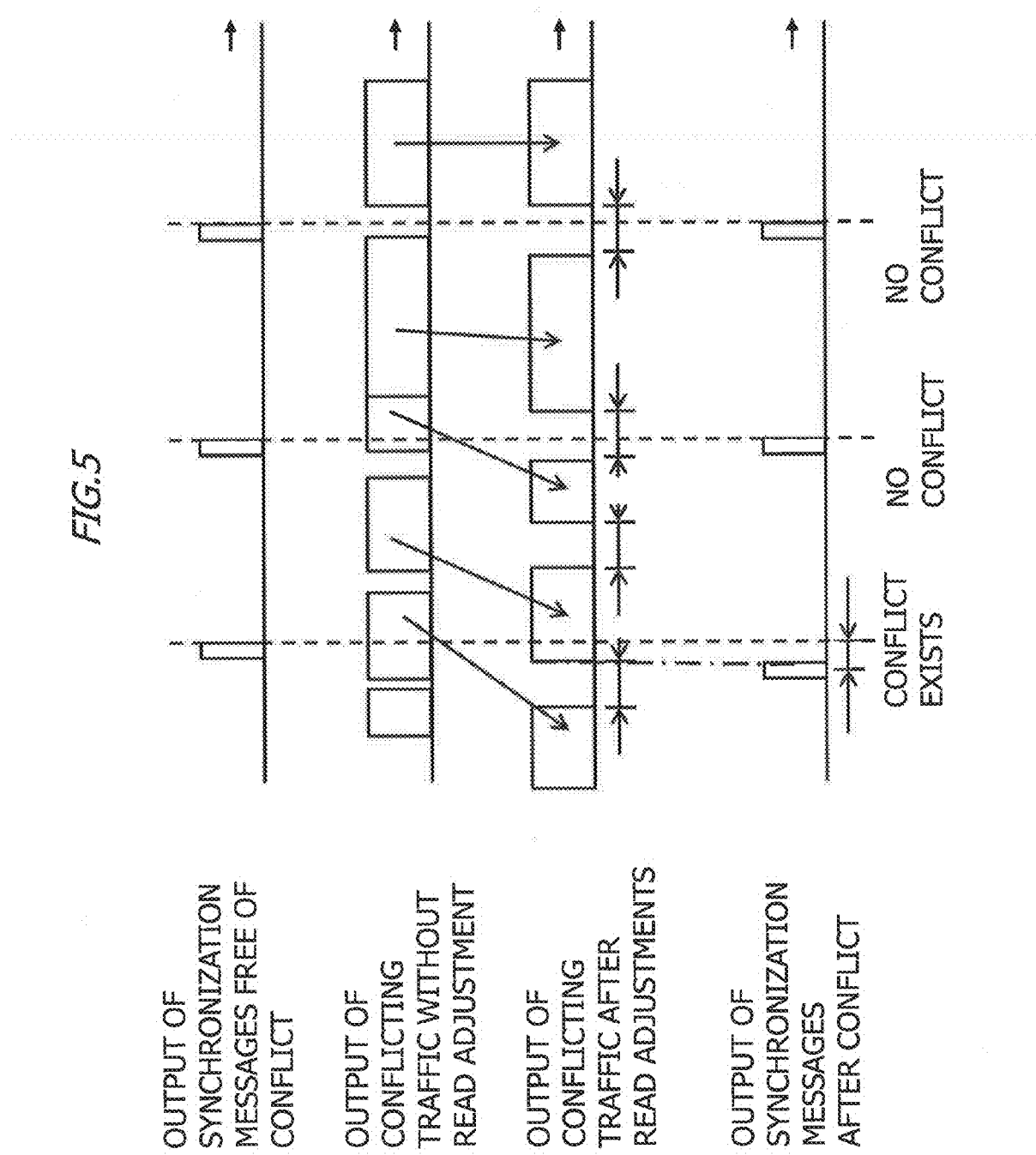
FIG. 5 is a diagram for explaining a read adjustment method for conflicting packets according to a first embodiment.

FIG. 5 is a diagram for explaining a read adjustment method for conflicting packets according to a first embodiment. FIG. 5 illustrates output of synchronization messages free of conflict, output of conflicting traffic without any read adjustment, output of conflicting traffic after read adjustments according to the first embodiment, and output of synchronization messages after a conflict according to the first embodiment. Incidentally, a packet is an example of data blocks, and the data blocks are not limited to packets. Besides, examples of data blocks include a frame. Hereinafter, both packets and frames are equally referred to as "packets" without distinguishing between them unless specifically noted.

Figure 1:
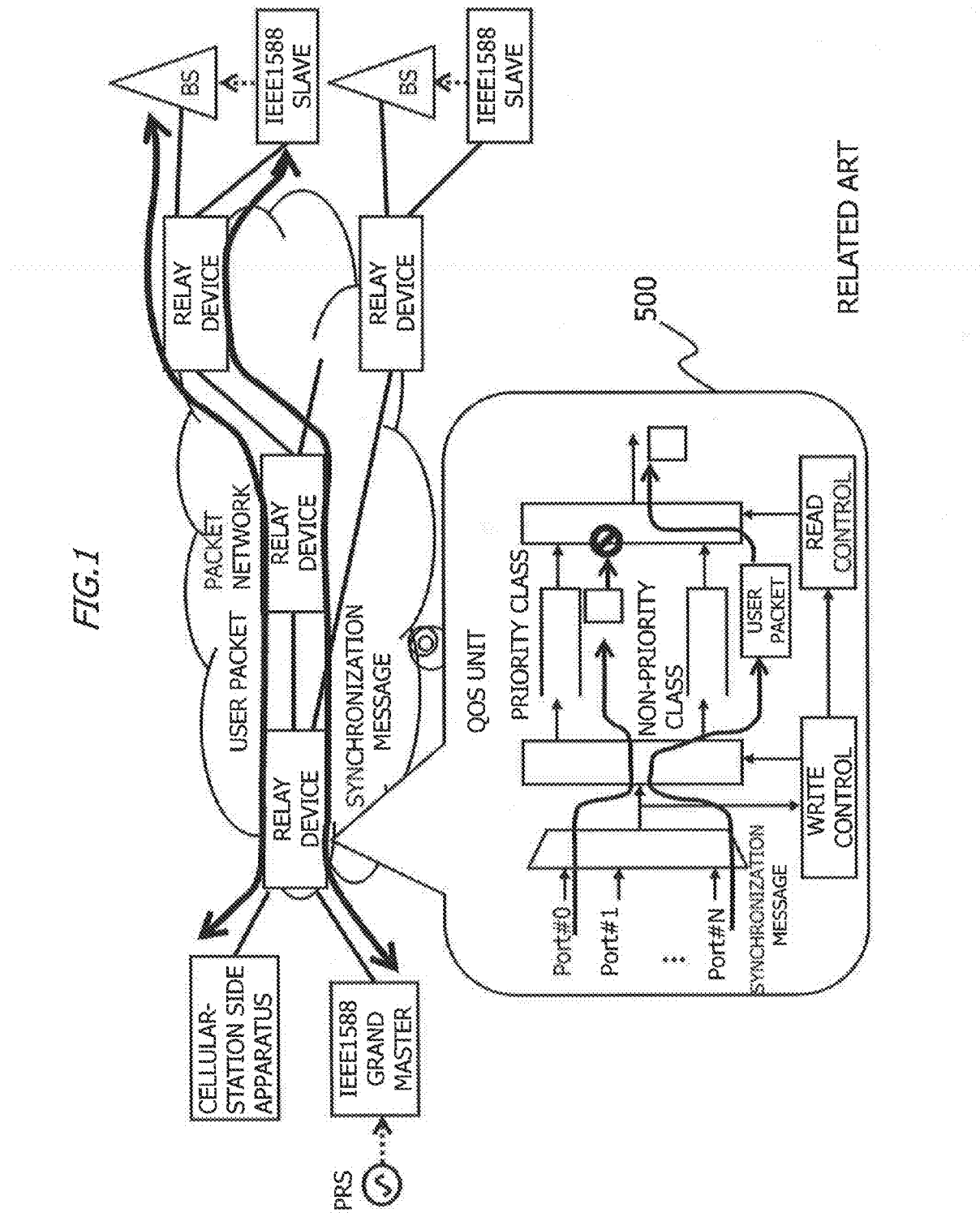
FIG. 1 is a diagram illustrating an example of a communication system which uses a packet-based frequency/time synchronization system.
Figure 2:
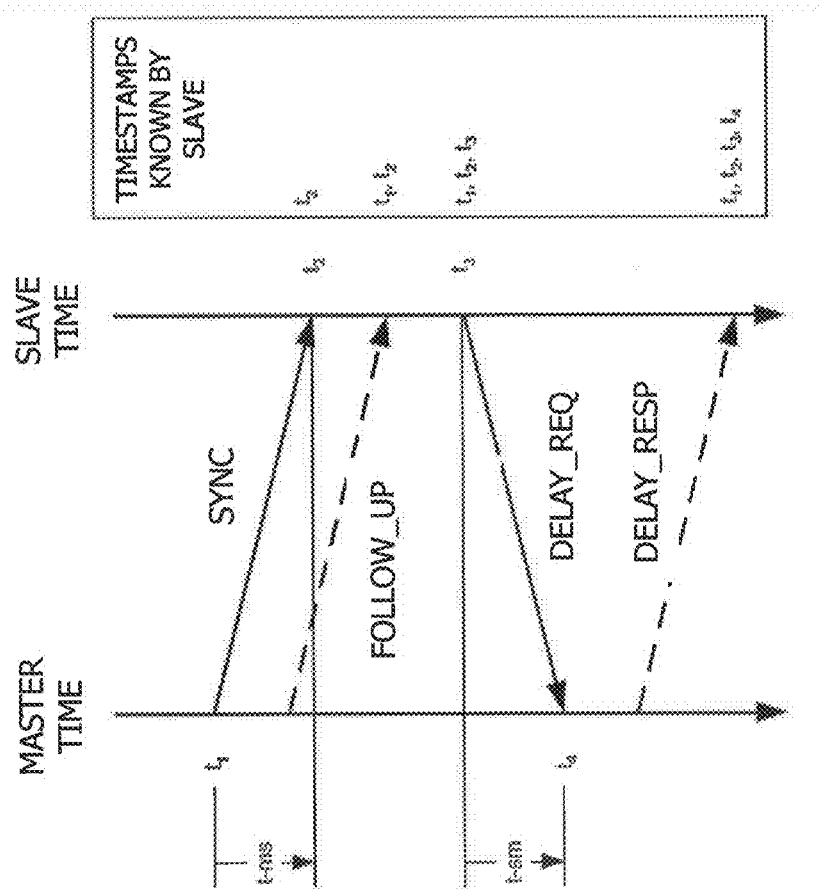
FIG. 2 is a diagram illustrating a mechanism for calculating an amount of time offset according to IEEE 1588.
Figure 3:
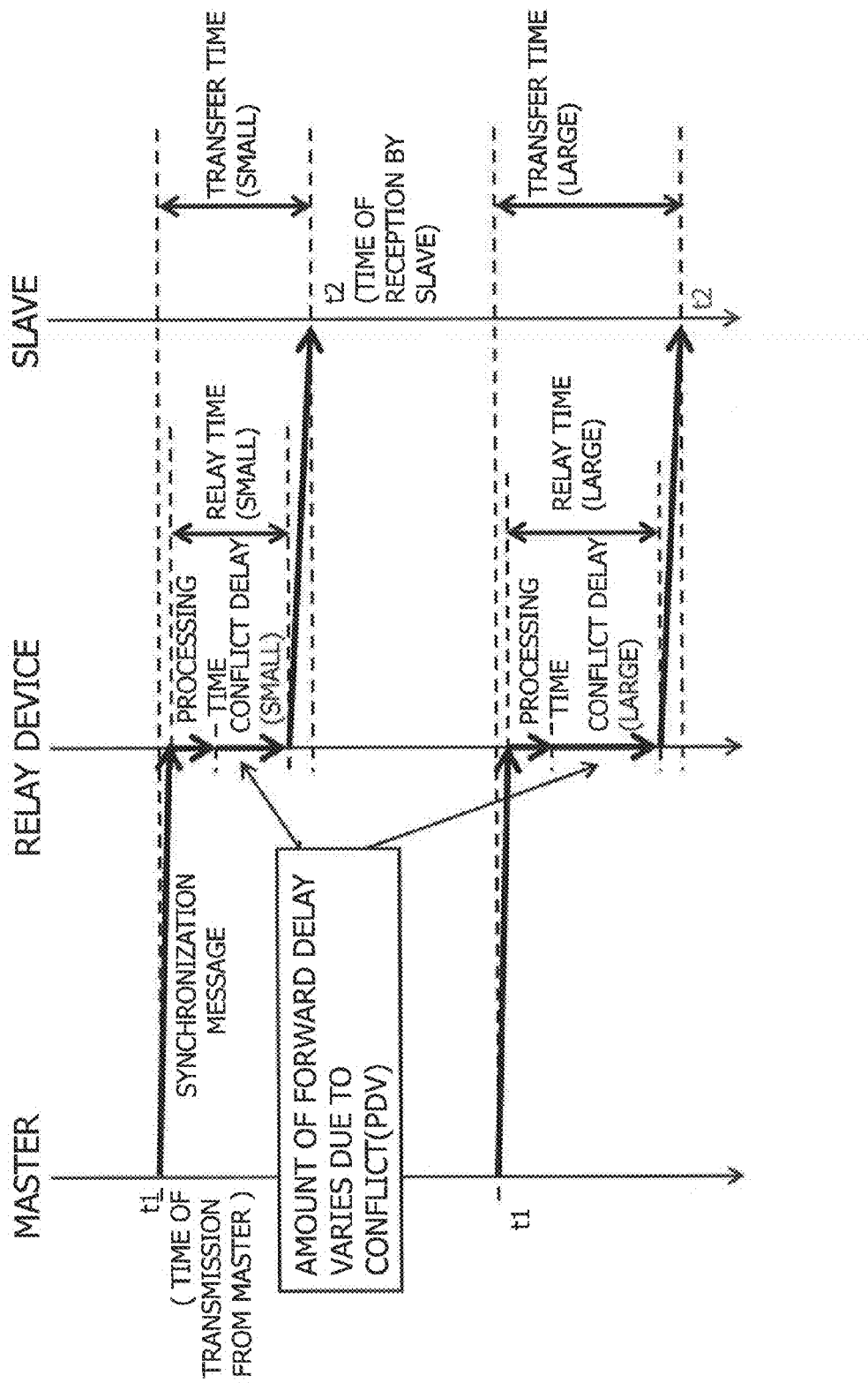
FIG. 3 is a diagram for explaining variations in forward delay time of a synchronization message.
Figure 4:
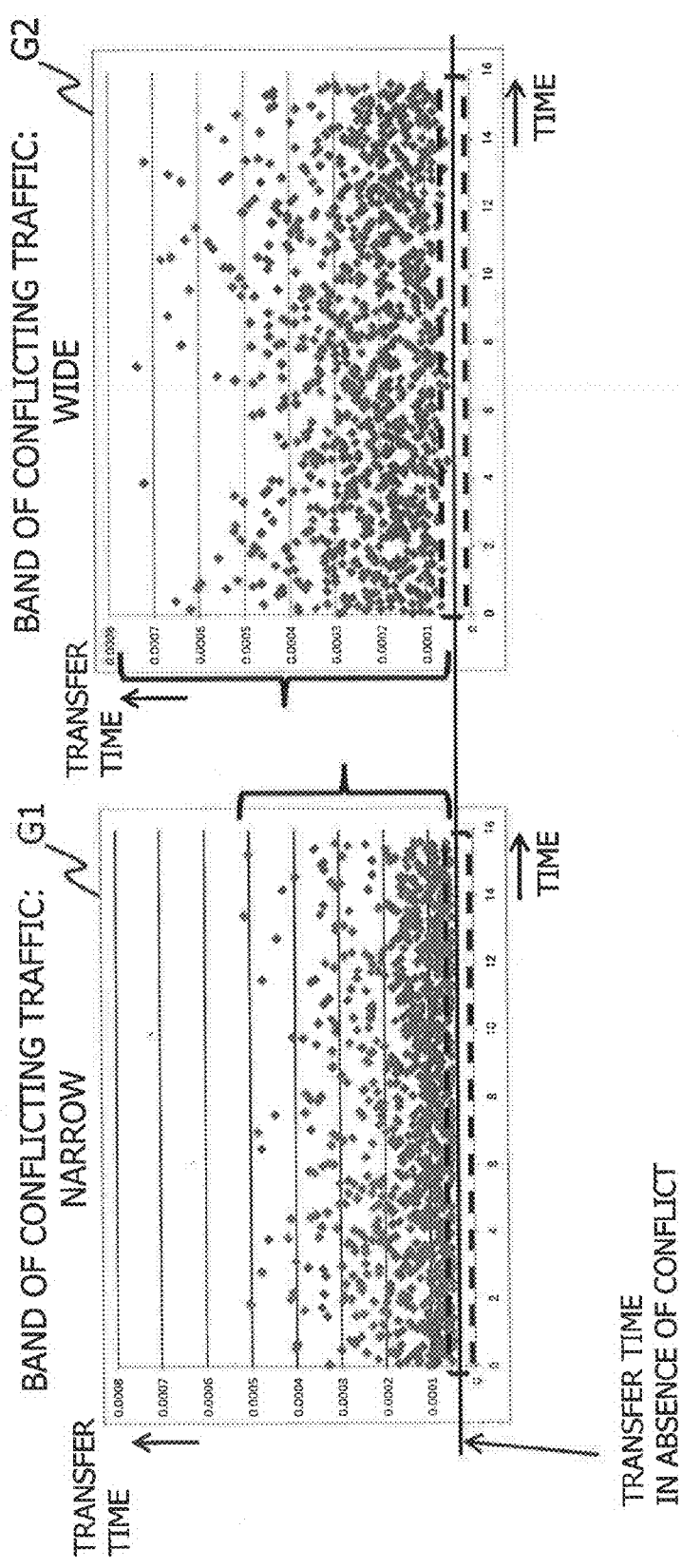
FIG. 4 is a diagram illustrating examples of delay distributions of synchronization messages.

According to the first embodiment, for example, in a QoS unit of a rely device in a communication system illustrated in FIG. 1, synchronization messages are classified into a top priority class while packets (conflicting traffic) other than synchronization messages are classified into a lower priority class than the top priority class. The rely device monitors for any synchronization-message conflict, and when the number of conflict-free synchronization messages is reduced, the rely device adjusts read timing of conflicting packets so as to expand read intervals among the conflicting packets (see the output of conflicting traffic after read timing adjustments in FIG. 5). This reduces the occurrence probability of synchronization-message conflict (see the output of synchronization messages after conflict in FIG. 5). By adjusting the read intervals among conflicting packets, the first embodiment secures a predetermined number of conflict-free synchronization messages.

<Configuration of Rely Device>

Figure 6:
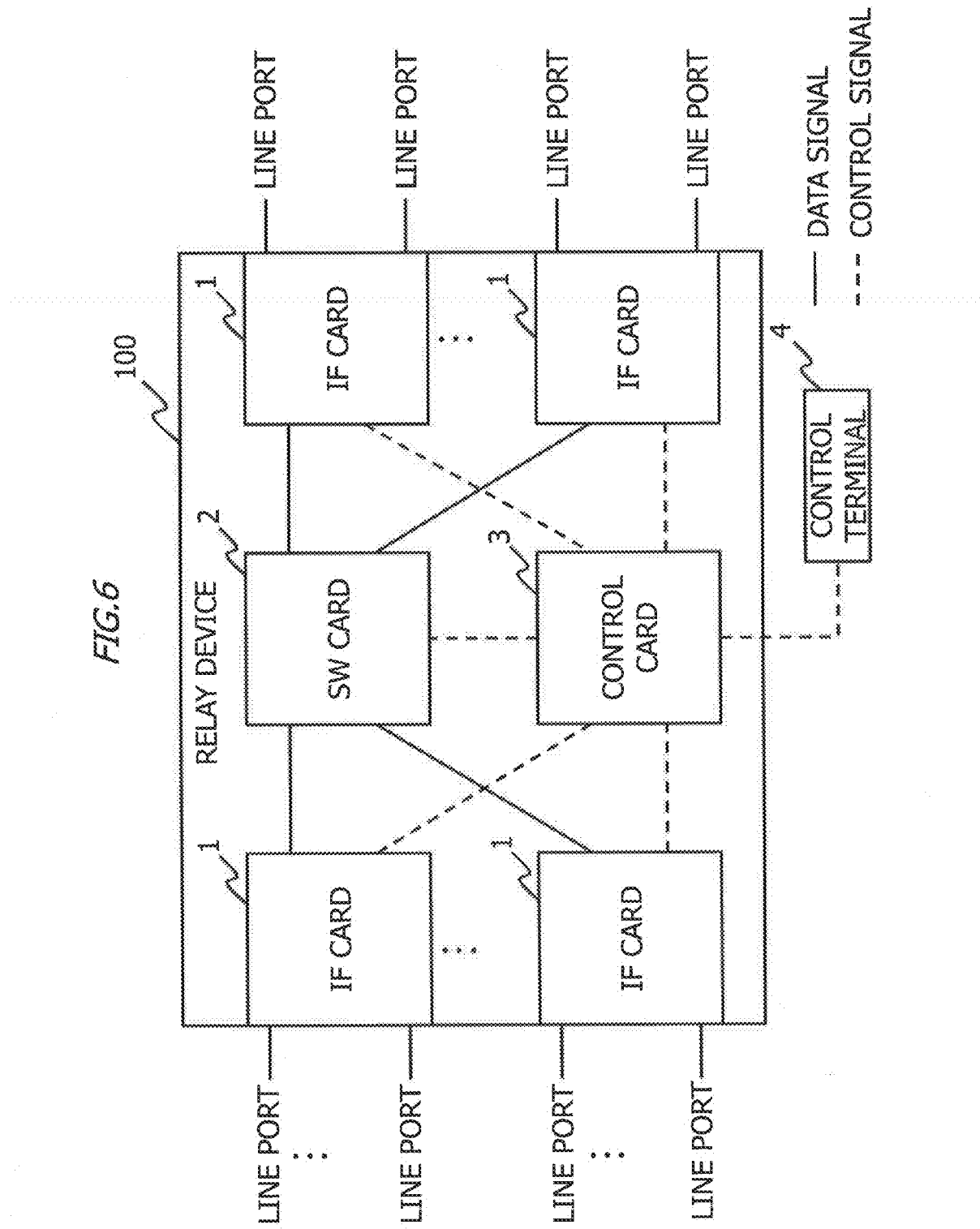
FIG. 6 is a diagram illustrating an exemplary schematic configuration of a rely device.

FIG. 6 is a diagram illustrating an exemplary schematic configuration of a rely device. The rely device is a packet rely device such as a router or switch. The rely device 100 includes plural IF cards 1, an SW card 2 adapted to relay packets among the IF cards 1, and a control card 3 adapted to control the cards of the rely device 100. The read intervals among conflicting packets are adjusted by the IF cards 1. The rely device is an example of a "data block output apparatus." Besides, examples of the "data block output apparatus" include a PTP master apparatus and PTP slave apparatus. Also, the rely device is an example of a "node." The PTP master apparatus and PTP slave apparatus are also examples of the "node." The nodes represent communication apparatuses which exist on the network.

Figure 7:
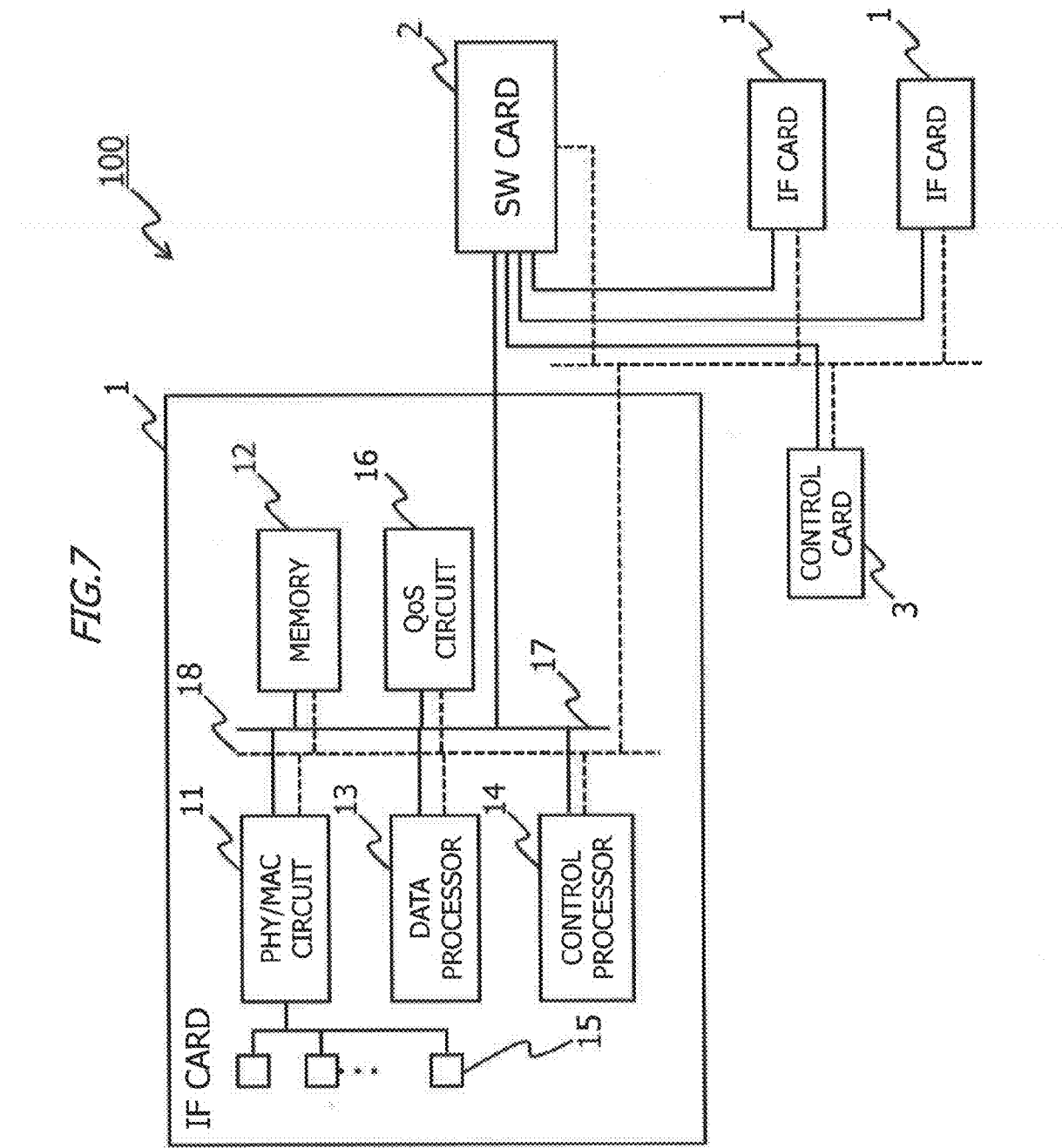
FIG. 7 is a diagram illustrating an exemplary hardware configuration of an IF card.

FIG. 7 is a diagram illustrating an exemplary hardware configuration of the IF card 1. The IF card 1 includes a PHY/MAC (PHYsical layer/MAC layer) circuit 11, memory 12, a data processor 13, a control processor 14, plural ports 15, and a QoS circuit 16. The plural ports 15 are connected to the PHY/MAC circuit 11. The PHY/MAC circuit 11, memory 12, data processor 13, control processor 14, and QoS circuit 16 are connected to both data bus 17 and control bus 18. In FIG. 7, the data bus is indicated by a solid line and the control bus is indicated by a dotted line. In FIG. 7, an address bus is omitted.

The PHY/MAC circuit 11 performs termination processing of physical layers and MAC layers of received frames inputted through the ports 15. The memory 12 include, for example, a volatile memory such as an SRAM (Static Random Access Memory) or DRAM (Dynamic Random Access Memory) and a non-volatile memory such as a PROM (Programmable Read Only Memory). The memory 12 store various programs and data.

The data processor 13 is, for example, an NPU (Network Processing Unit) or communication processor which performs data processing related to communications. The data processor 13 processes frames encoded by the PHY/MAC circuit 11 and frames transferred from the SW card 2. The control processor 14 is, for example, a CPU (Central Processing Unit). The control processor 14 manages the PHY/MAC circuit 11, memory 12, data processor 13, and QoS circuit 16.

Each of the PHY/MAC circuit 11, memory 12, data processor 13, control processor 14, and QoS circuit 16 included in the IF card 1 may be a separate device or chip. Alternatively, the IF card 1 may be one or more LSIs (Large Scale Integrations) containing these circuits and devices. Also, the hardware configuration of the IF card 1 is not limited to the one illustrated in FIG. 7. For example, an FPGA (Field Programmable Gate Array), IC logic device, and the like may be added in addition to the components illustrated in FIG. 7. Also, the control processor 14 and data processor 13 may be replaced by a single processor which functions as both.

Figure 8:
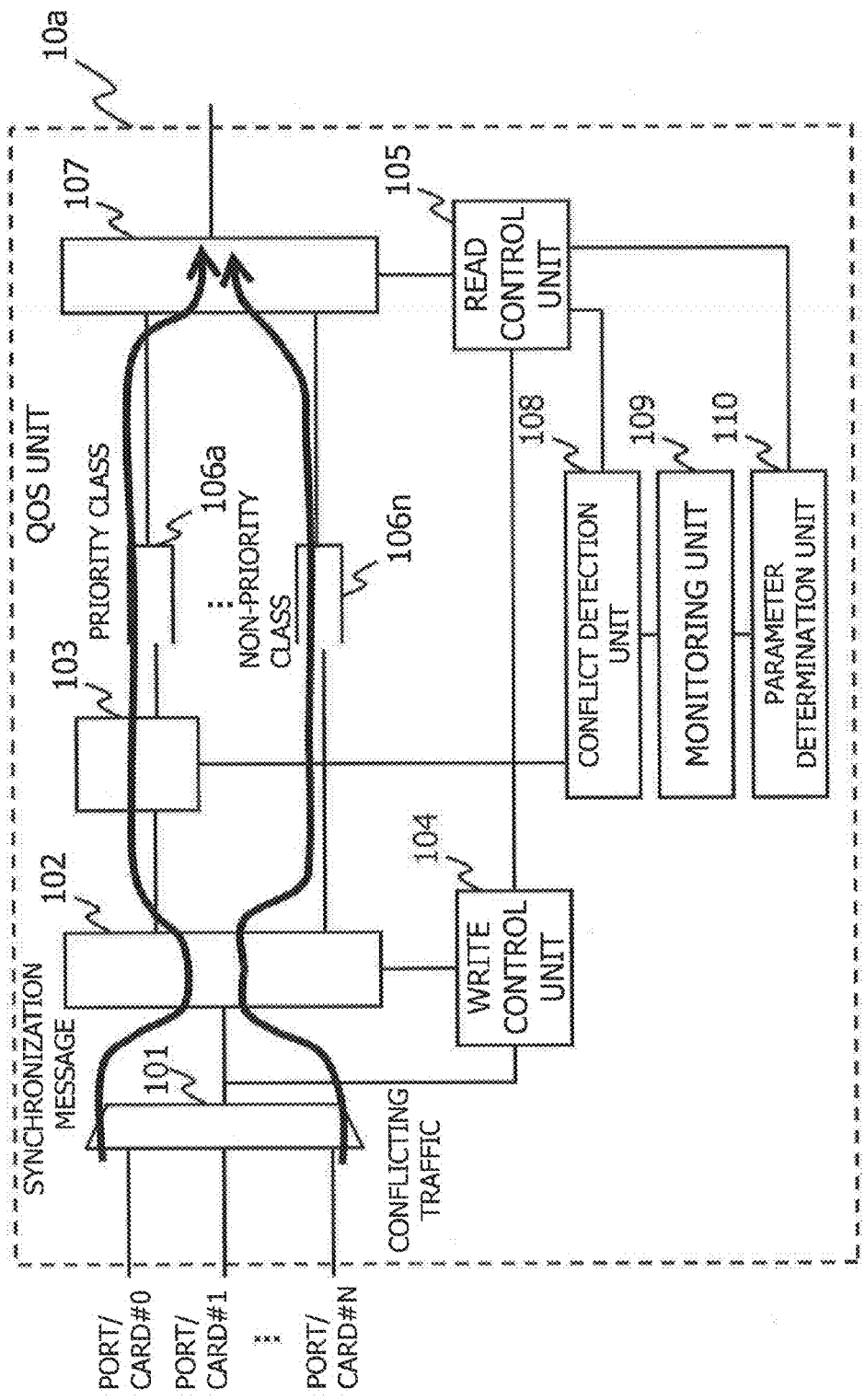
FIG. 8 is an exemplary functional block diagram of a QoS circuit.

FIG. 8 is an exemplary functional block diagram of the QoS circuit 16. FIG. 8 illustrates a QoS unit 10a which is an output-side function of the IF card 1. The QoS unit 10a includes a multiplexing unit 101, selectors 102 and 107, a synchronization message identification unit 103, a write control unit 104, a read control unit 105, a priority class queue 106a, a non-priority class queue 106n, a conflict detection unit 108, a monitoring unit 109, and a parameter determination unit 110. Each of these components is implemented by an electric circuit, electronic circuit, FPGA, or the like. Also, the monitoring unit 109 and parameter determination unit 110 may be implemented by software processes of a processor (not illustrated in FIG. 7) included in the QoS circuit 16. The priority class queue 106a and non-priority class queue 106n are FIFO (First In First Out) queues. Although two queues—the priority class queue 106a and non-priority class queue 106n—are illustrated in FIG. 8, this is not restrictive, and more than two queues may be provided. The non-priority class queue 106n is an example of a "first queue" while the priority class queue 106a is an example of a "second queue."

The packets inputted through ports of the rely device 100 and relayed by the SW card 2 to the IF card 1 are multiplexed by the multiplexing unit 101 and outputted to the selector 102 and write control unit 104. The write control unit 104 identifies a priority class of each packet based on information obtained from a header of the packet as well as on QoS setting information and outputs class identification information about the packet to the selector 102. Based on the class identification information received from the write control unit 104, the selector 102 outputs the packet to an appropriate priority class queue.

Between the selector 102 and priority class queue 106a, the synchronization message identification unit 103 detects synchronization messages from among the packets outputted to the priority class queue 106a, and then outputs the detection of the synchronization messages to the conflict detection unit

108. Whether a packet is a synchronization message can be judged from the packet header.

Figure 9:
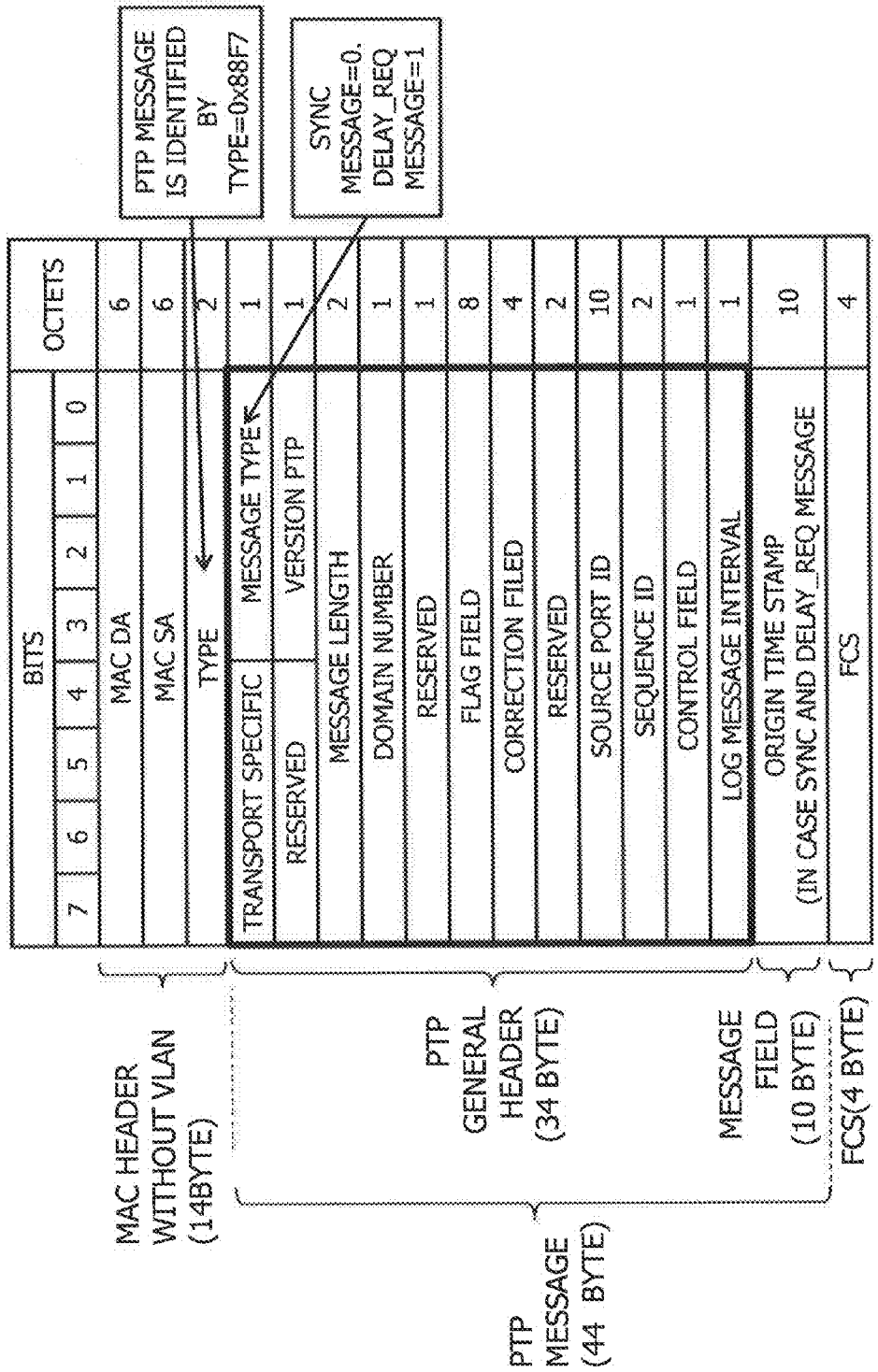
FIG. 9 is a diagram illustrating a format of synchronization messages on layer 2.

FIG. 9 is a diagram illustrating a format of a synchronization message on layer 2. According to the first embodiment, Sync messages and Delay_Req messages are monitored out of PTP messages, and thus FIG. 9 illustrates both Sync and Delay_Req messages.

In the case of a PTP message, a type field in a MAC (Media Access Control) header illustrated in FIG. 9 contains a value of 0x88F7. In the case of a Sync message, a message type field in a PTP header following the MAC header contains a value of 0. In the case of a Delay_Req message, the message type field in the PTP header contains a value of 1.

When a PTP message is used on layer 2, if the type field in the MAC header of the packet contains a value of 0x88F7 and the message type field of the PTP header contains 0 or 1, the synchronization message identification unit 103 judges that the packet is a synchronization message.

Figure 10:
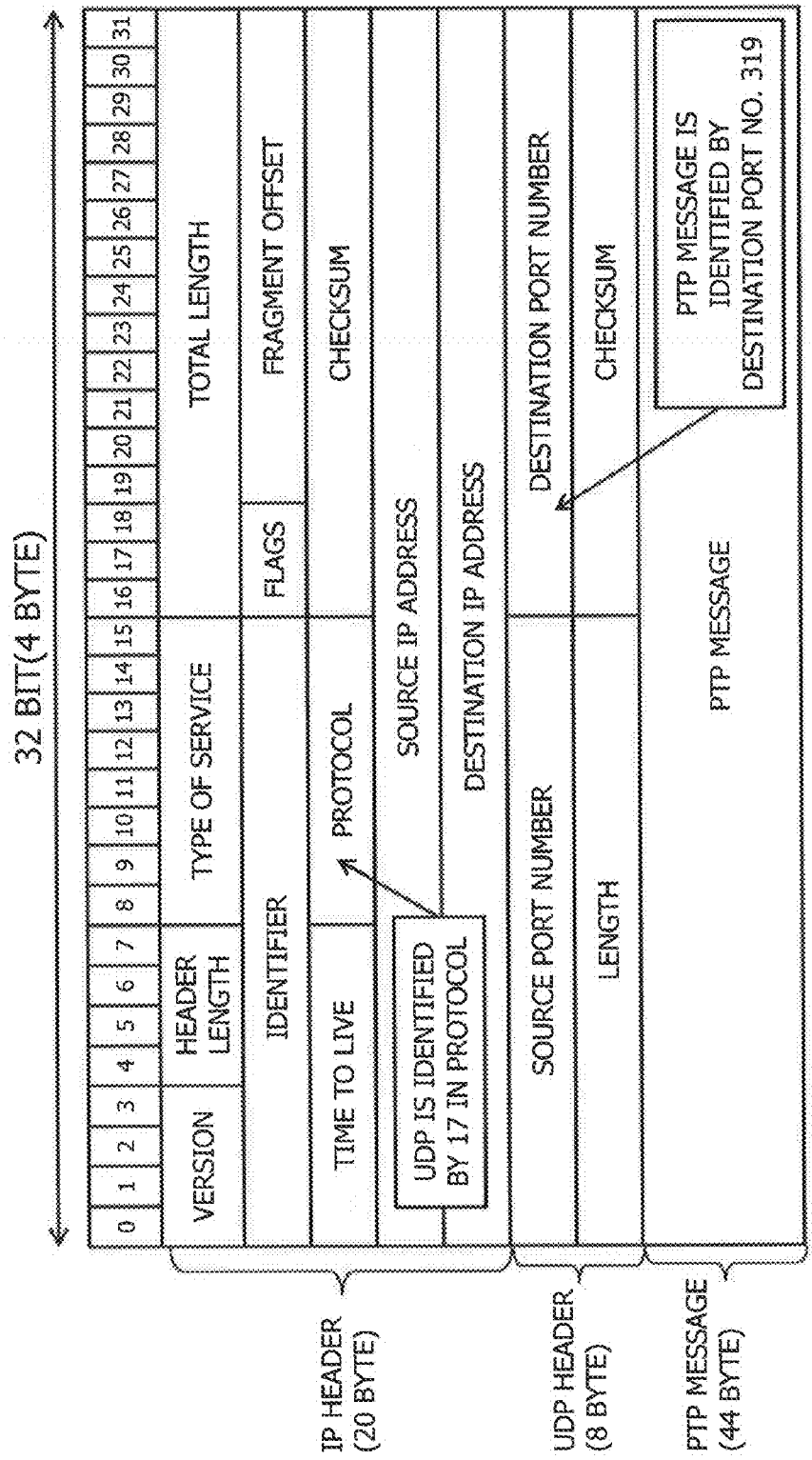
FIG. 10 is a diagram illustrating a format of synchronization messages on layer 3.

FIG. 10 is a diagram illustrating a format of synchronization messages on layer 3. The PTP uses the UDP (User Datagram Protocol) on the IP. Therefore, a protocol field in an IP header of a PTP message contains a value of 17, which represents the UDP. Also, PTP messages use port No. 319, and thus a destination port No. field in a UDP header contains a value of 319.

When a PTP message is used on layer 3, if the protocol field in the IP header of the packet contains a value of 17 and the destination port No. of the UDP header is 319, the synchronization message identification unit 103 determines that the packet is a synchronization message.

Returning to FIG. 8, the conflict detection unit 108 checks each synchronization message for any conflict. The conflict detection unit 108 receives read status of the non-priority class queue 106n as input from the read control unit 105. The read status of the non-priority class queue 106n represents whether or not a packet is being read out of the non-priority class queue 106n. For example, the conflict detection unit 108 receives read status of the non-priority class queue 106n as input from the read control unit 105 on a regular cycle or each time when there is any change in the read status of the non-priority class queue 106n.

When detection of a synchronization message is received as input from the synchronization message identification unit 103, if a packet is being read out of the non-priority class queue 106n, the conflict detection unit 108 judges that the synchronization message is in conflict. On the other hand, if no packet is being read out of the non-priority class queue 106n when detection of a synchronization message is received as input from the synchronization message identification unit 103, the conflict detection unit 108 judges that the synchronization message is free of conflict. The conflict detection unit 108 outputs the presence or absence of conflict to the monitoring unit 109 regarding each synchronization message. Incidentally, if there are plural non-priority class queues, the conflict detection unit 108 acquires packet read status of each of the non-priority class queues. Also, when detection of a synchronization message is received as input, if a packet is being read out of any one of the non-priority class queues, the conflict detection unit 108 judges that the synchronization message is in conflict.

The monitoring unit 109 receives the presence or absence of synchronization-message conflict as input from the conflict detection unit 108, statistically monitors the presence or absence of conflict, and calculates a conflict probability of synchronization messages in a predetermined range. The conflict probability is the ratio of the total number of synchronization messages in conflict to the total number of synchronization messages contained in the predetermined range. Incidentally, instead of the conflict probability, the monitoring unit 109 may calculate the probability of no conflict, i.e., the ratio of the total number of synchronization messages free of conflict to the total number of synchronization messages contained in the predetermined range. The monitoring unit 109 outputs the calculated conflict probability to the parameter determination unit 110. The predetermined range may be, for example, a range defined in terms of time or a range defined by the number of synchronization messages. The monitoring unit 109 is an example of a "monitoring unit." The conflict probability of synchronization messages is an example of "occurrence frequency." The "occurrence frequency" is not limited to the conflict probability, and may be the number of conflicting synchronization messages in X synchronization messages.

If the conflict probability received from the monitoring unit 109 is equal to or higher than a first threshold, the parameter determination unit 110 determines packet read intervals (packet intervals) of the non-priority class queue 106n (conflicting traffic) and notifies the read control unit 105 of the determined packet intervals. The first threshold is, for example, a value between 95% and 99%. The packet read interval of the non-priority class queue 106n is a duration or clock count from the time when reading of the first packet out of the non-priority class queue 106n is completed to the time when the next packet starts to be read, when there is no packet in higher class queues. Calculation of the packet interval and notification to the read control unit 105 may be made once or repeatedly while the conflict probability remains to be equal to or higher than the first threshold.

Available methods for determining the packet interval include, for example: (1) a method which uses a predetermined duration established in advance, as the packet interval, (2) a method which increases the packet interval gradually from a predetermined amount established in advance and stops the increase when the conflict probability reaches a predetermined value, which may be either larger than or equal to the first threshold used to judge whether to determine a packet interval, (3) a method which uses a table containing packet intervals corresponding to conflict probabilities, and (4) a method which uses a predetermined conversion formula f(x), where a variable x is the probability of no conflict.

A relationship between the packet interval and conflict probability is defined in the table in (3) and conversion formula in (4) such that the higher the conflict probability, the larger the packet interval of conflicting traffic will be. Any of the packet interval determination methods (1) to (4) may be used. However, available packet interval determination methods are not limited to (1) to (4).

When the conflict probability received from the monitoring unit 109 becomes lower than a second threshold, the parameter determination unit 110 outputs Reset Packet Interval for conflicting traffic to the read control unit 105. The parameter determination unit 110 may reset the packet interval, for example, by outputting 0 as the packet interval to the read control unit 105. Also, the second threshold may be a value of conflict probability smaller than the first threshold or a value of conflict probability equal to the first threshold. The parameter determination unit 110 is an example of a "control unit."

The read control unit 105 controls the reading of packets from each queue. The write control unit 104 sends packet identification information, packet length, and class identification information of the packet which has reached the QoS unit 10a to the read control unit 105. The packet identification information includes, for example, a number assigned to each packet by the multiplexing unit 101 during packet multiplexing, a memory address at which the packet is temporarily stored, and a unique value such as an FCS or checksum in the packet header. Based on the information received as input from the write control unit 104, the read control unit 105 recognizes packet storage status of each queue. The read control unit 105 instructs the selector 107 to read packets from each queue in descending order of priority class based on the packet storage status of the queue. Specifically, based on the packet identification information and class identification information received as input from the write control unit 104, the read control unit 105 determines the order in which the packets are to be read. In so doing, the packets are set to be read in descending order of priority class in the class identification information. Also, based on the packet length, the read control unit 105 calculates the duration of time taken to read each packet. The read control unit 105 outputs the packet identification information and class identification information of the packet to be read to the selector 107 as read instructions.

If a packet interval is not received as input from the parameter determination unit 110, or if the packet interval has been reset, the read control unit 105 gives an instruction to read a next packet upon completion of reading of a packet based on a determined reading order. For example, if packet P1 is stored in the priority class queue 106*a* and packets P2 and P3 are stored in the non-priority class queue 106*n*, the read control unit 105 establishes a reading order so as to read packets P1, P2, and P3 in this order. First, the read control unit 105 outputs an instruction to read packet P1 (the class identification information and packet identification information about packet P1). Then, since the duration of time taken to read each packet is known, the read control unit 105 outputs an instruction to read packet P2 out of the non-priority class queue 106*n* to the selector 107, timed with the completion of reading of packet P1. Similarly, timed with the completion of reading of packet P2, the read control unit 105 outputs an instruction to read packet P3 out of the non-priority class queue 106*n* to the selector 107.

If a packet interval of conflicting traffic is received as input from the parameter determination unit 110, the read control unit 105 reads packets out of the non-priority class queue 106*n* at packet intervals specified by the parameter determination unit 110. For example, if packet P1 is stored in the priority class queue 106*a* and packets P2 and P3 are stored in the non-priority class queue 106*n* and a packet reading order has been established so as to read packets P1, P2, and P3 in this order, the read control unit 105 outputs packet read instructions to the selector 107 as follows. First, the read control unit 105 outputs an instruction to read packet P1. Then, timed with the completion of reading of packet P1, the read control unit 105 outputs an instruction to read packet P2 out of the non-priority class queue 106*n* to the selector 107. Next, after the reading of packet P2 is completed, upon elapse of a time duration corresponding to the packet interval determined by the parameter determination unit 110, the read control unit 105 outputs an instruction to read packet P3 out of the non-priority class queue 106*n* to the selector 107. The read control unit 105 and selector 107 are examples of "reading unit."

Figure 11A:
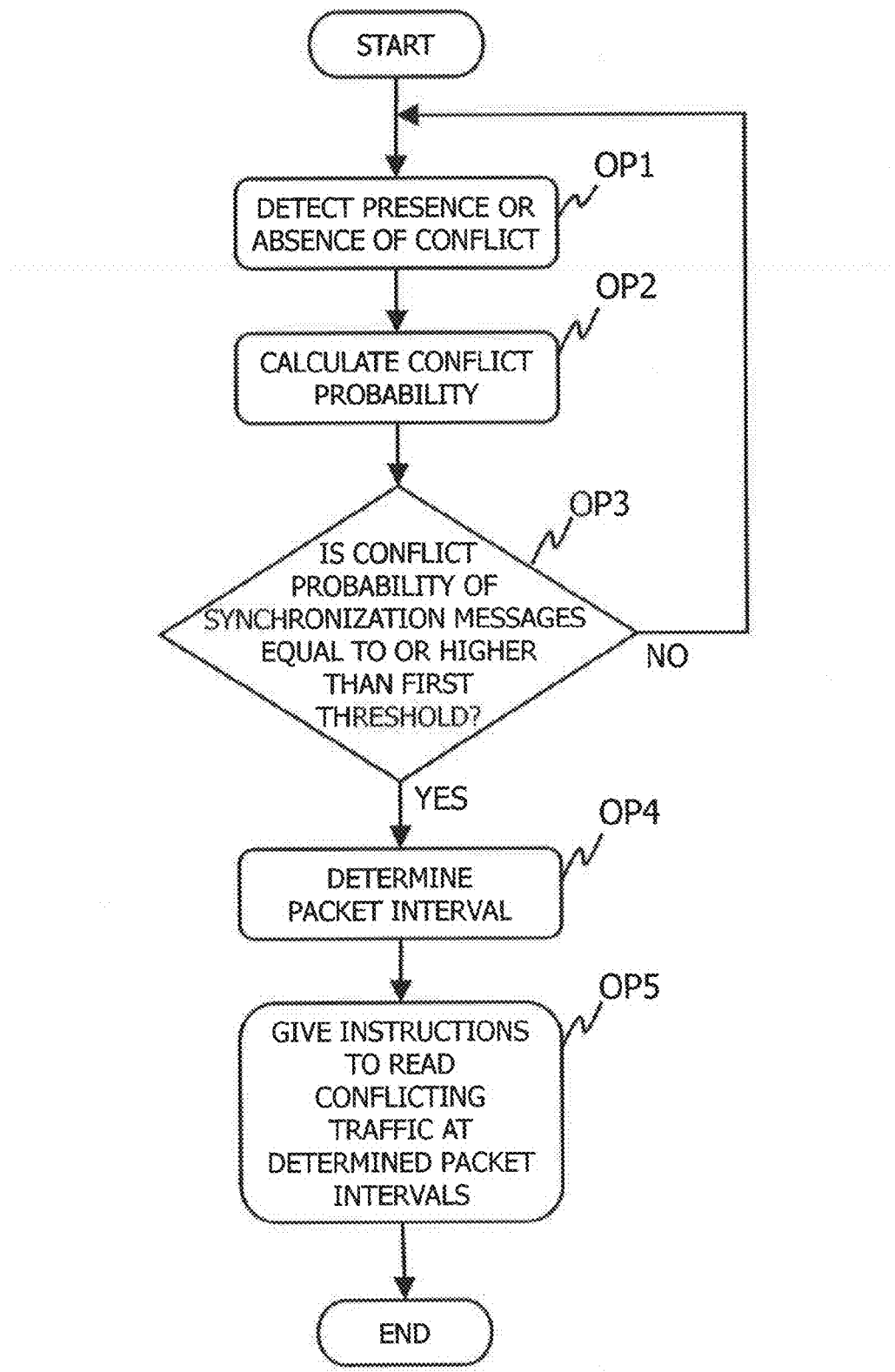
FIG. 11A is a flowchart illustrating an exemplary process of a QoS unit according to the first embodiment.
Figure 11B:
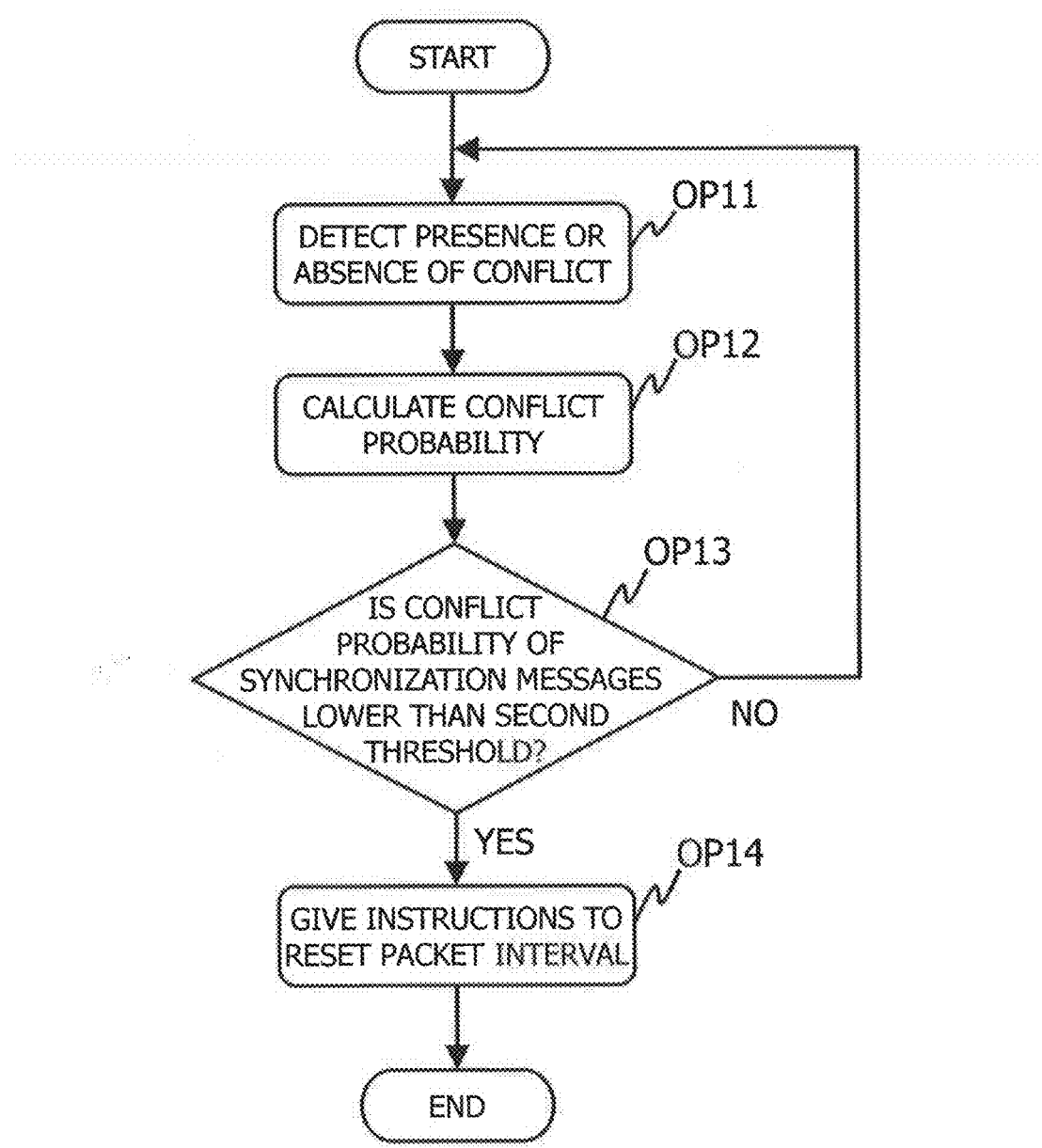
FIG. 11B is a flowchart illustrating an exemplary process of the QoS unit according to the first embodiment.

FIGS. 11A and 11B are flowcharts illustrating exemplary processes of the QoS unit 10*a* according to the first embodiment. The flowchart in FIG. 11A is started when the packet interval is at an initial value (=0) and a synchronization message is inputted in the QoS unit 10*a*.

In OP1, the QoS unit 10*a* detects the presence or absence of synchronization-message conflict. The conflict encountered by the synchronization message is detected by finding that a packet is being read out of the non-priority class queue 106*n* during input of the synchronization message. Next, the processing goes to OP2.

In OP2, the QoS unit 10*a* calculates the conflict probability of synchronization messages. The conflict probability of synchronization messages is calculated using synchronization messages contained in a range found by going back a predetermined period of time or predetermined number of synchronization messages from the inputted synchronization message. Next, the processing goes to OP3.

In OP3, the QoS unit 10*a* judges whether or not the conflict probability is equal to or higher than the first threshold. If the conflict probability is equal to or higher than the first threshold (OP3: Yes), the processing goes to OP4. If the conflict probability is lower than the first threshold (OP3: No), the processing returns to OP1, and then the processes of OP1 to OP3 are repeated.

In OP4, the QoS unit 10*a* determines the packet interval of the conflicting traffic. Next, the processing goes to OP5. In OP5, the non-priority class queue 106*n* (conflicting traffic) is read at the determined packet intervals by the QoS unit 10*a*. This ends the processes illustrated in FIG. 11A.

The process of OP1 corresponds to the conflict detection unit 108. The process of OP2 corresponds to the monitoring unit 109. The processes of OP3 and OP4 correspond to the parameter determination unit 110. The process of OP5 corresponds to the read control unit 105 and selector 107.

The flowchart in FIG. 11B is started when the packet interval of conflicting traffic is not at the initial value (=0) and a synchronization message is inputted in the QoS unit 10*a*, i.e., after the flowchart in FIG. 11A is executed.

In OP11, the QoS unit 10*a* detects the presence or absence of synchronization-message conflict. Next, the processing goes to OP12. In OP12, the QoS unit 10*a* calculates the conflict probability of synchronization messages. Next, the processing goes to OP13.

In OP13, the QoS unit 10*a* judges whether or not the conflict probability is lower than the second threshold. If the conflict probability is lower than the second threshold (OP13: Yes), the processing goes to OP14. If the conflict probability is equal to or higher than the second threshold (OP13: No), the processing returns to OP11, and then the processes of OP11 to OP13 are repeated.

In OP14, the QoS unit 10*a* resets the packet interval of conflicting traffic, i.e., returns the packet interval to the initial value (=0). This ends the flow illustrated in FIG. 11B. Subsequently, when a synchronization message is inputted, the flowchart in FIG. 11A is executed.

However, the method for resetting the packet interval is not limited to the method of returning the packet interval to the initial value (=0), and may be, for example, a method of reducing the packet interval gradually and eventually to the initial value (=0). In this case, the QoS unit 10*a* specifies the packet interval to the read control unit 105 in a number of separate batches in OP14.

The process of OP11 corresponds to the conflict detection unit 108. The process of OP12 corresponds to the monitoring unit 109. The processes of OP13 and OP14 correspond to the parameter determination unit 110.

If the method of gradually increasing the packet interval described in (2) above is adopted as a method for determining the packet interval of conflicting traffic, the processes of FIG. 11A may be performed repeatedly in parallel with the flowchart of FIG. 11B. However, the first threshold in OP3 of FIG. 11A is substituted with a predetermined threshold. Also, even when the method described in (1), (3), or (4) above is used as a method for determining the packet interval of conflicting traffic, the processes of FIG. 11A may be performed repeatedly in parallel with the flowchart of FIG. 11B.

<Operation and Effect of First Embodiment>

According to the first embodiment, when the conflict probability of synchronization messages is equal to or higher than the first threshold, the rely device expands the packet interval of the conflicting traffic. This increases the period (packet interval) during which the conflicting traffic, if any exists on the rely device, is not read. Consequently, even if there is conflicting traffic on the rely device, it is possible to reduce the conflict probability of synchronization messages, allowing the PTP slave device to secure a predetermined number of conflict-free synchronization messages. This makes it possible to improve the accuracy of the packet-based frequency/time synchronization system.

The disclosed data block output apparatus, communication system, data block output method, and communication method can reduce occurrences of delays caused by reading of low priority data blocks when outputting high priority data blocks.

<Second Embodiment>

According to the second embodiment, packet length of conflicting traffic is adjusted in addition to the packet interval of the conflicting traffic. In the second embodiment, description in common with the first embodiment will be omitted.

Figure 12:
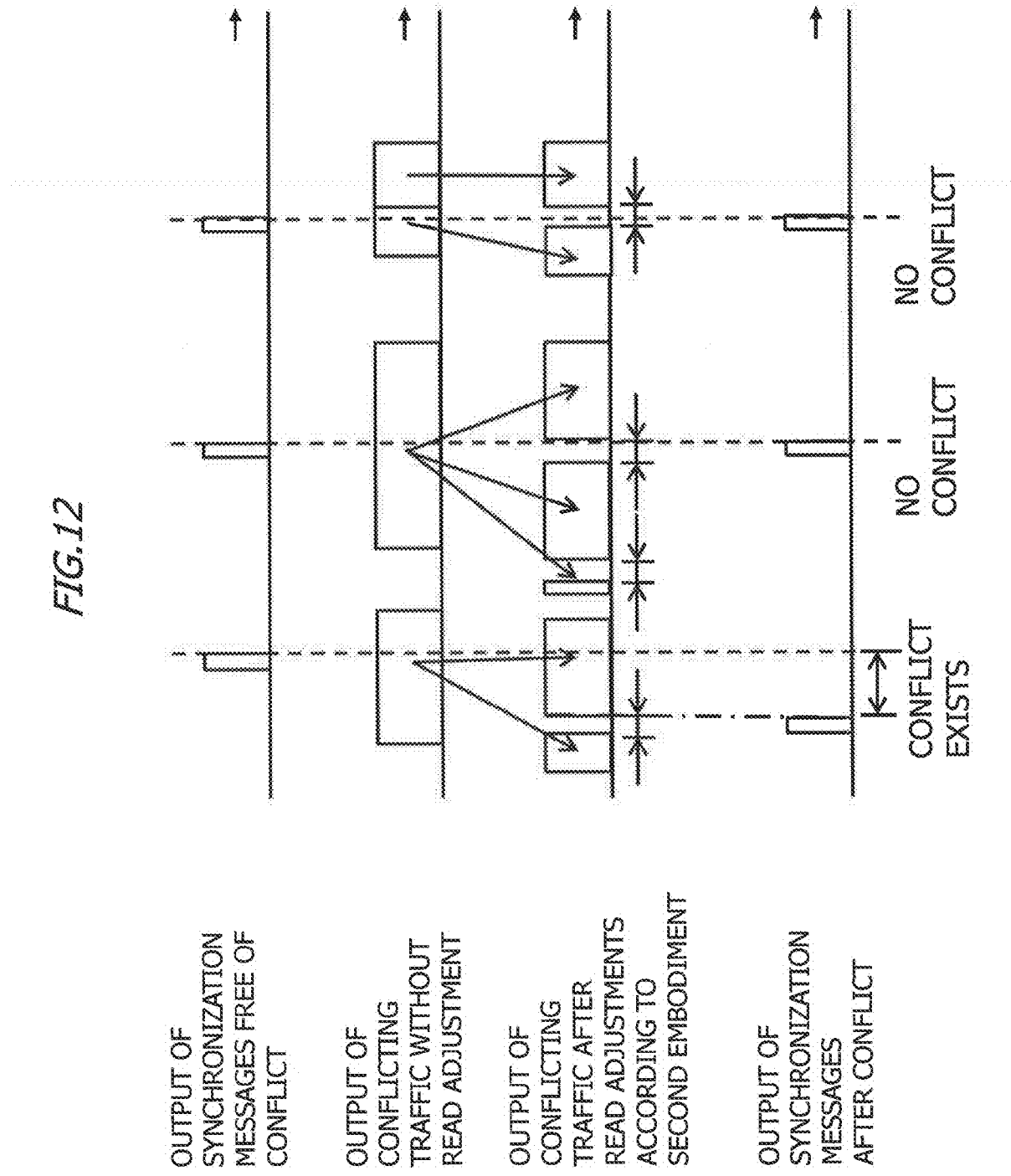
FIG. 12 is a diagram for explaining a read adjustment method for conflicting packets according to a second embodiment.

FIG. 12 is a diagram for explaining a read adjustment method for conflicting packets according to a second embodiment. As in the case of FIG. 5, FIG. 12 illustrates output of synchronization messages free of conflict, output of conflicting traffic without any read adjustment, output of conflicting packets after read adjustments according to the second embodiment, and output of synchronization messages after a conflict according to the second embodiment.

According to the second embodiment, the rely device monitors for any synchronization-message conflict. When the conflict probability of synchronization messages is equal to or higher than the first threshold, the rely device divide any conflicting packet into a packet length equal to or smaller than a predetermined packet length and expands the packet interval of the conflicting traffic (see output of conflicting traffic after read adjustments in FIG. 12). By dividing the conflicting packets with a long packet length into a packet length equal to or smaller than a predetermined packet length, it is possible to keep the time taken to read each conflicting packet, i.e., the time during which one conflicting packet is read exclusively, to or below a predetermined value. Also, when conflicting packets with a long packet length are divided, read intervals of the conflicting packets are increased. This reduces the occurrence probability of synchronization-message conflict (see the output of synchronization messages after conflict in FIG. 12). The second embodiment secures a predetermined number of conflict-free synchronization messages by adjusting packet length of conflicting traffic in addition to the packet interval of the conflicting traffic.

Figure 13:
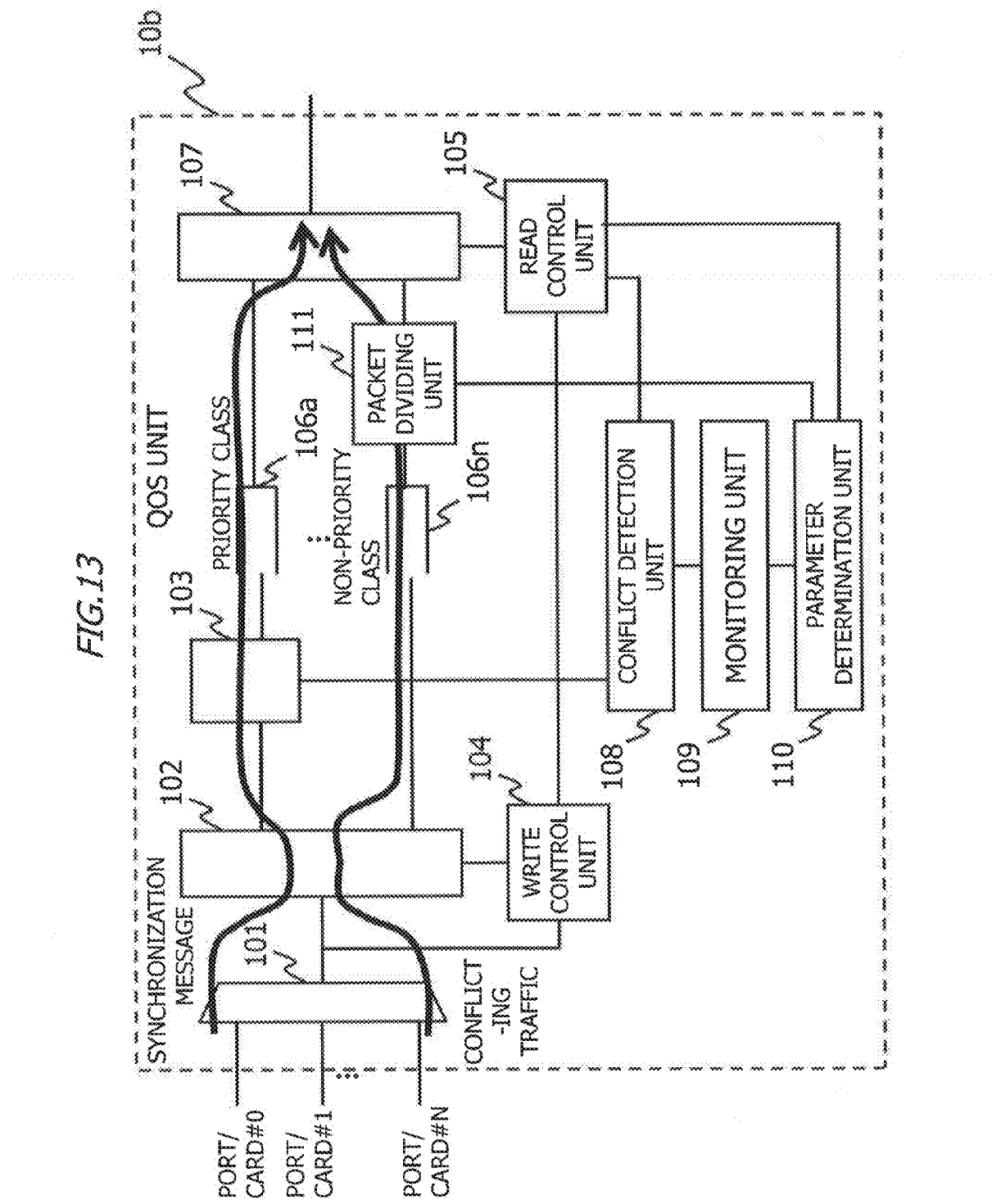
FIG. 13 is an exemplary functional block diagram of a QoS unit according to the second embodiment.

FIG. 13 is an exemplary functional block diagram of a QoS unit 10b according to the second embodiment. In addition to the functional blocks of the QoS unit 10a according to the first embodiment, the QoS unit 10b further includes a packet dividing unit 111.

According to the second embodiment, when the conflict probability of synchronization messages is equal to or higher than the first threshold, the parameter determination unit 110 determines fragment length of the conflicting traffic in addition to the packet interval of the conflicting traffic. The fragment length is an upper limit of the packet length of the conflicting packets. Therefore, any conflicting packet whose length exceeds the fragment length is divided into plural packets with a packet length equal to or smaller than the fragment length. Regarding the packet interval determination methods for conflicting traffic, the methods according to the first embodiment apply correspondingly.

Available methods for determining the fragment length of conflicting packets include, for example: (A) a method which determines a predetermined packet length established in advance, as the fragment length, (B) a method which decreases the packet length gradually from a predetermined packet length established in advance and stops the decrease in the fragment length when the conflict probability reaches a predetermined value, which may be either larger than or equal to the first threshold used to judge whether to determine a packet interval, (C) a method which uses a table containing packet lengths corresponding to conflict probabilities of synchronization messages and/or to packet intervals, and (D) a method which uses a predetermined conversion formula g(x, f(x)), where a variable x is the probability of no synchronization-message conflict.

Relationships among the fragment length, conflict probability, and packet interval are defined in the table in (C) and conversion formula in (D), for example, such that the higher the conflict probability, the smaller the fragment length will be and/or that the larger the packet interval of conflicting traffic, the larger the fragment length will be. Any of the methods (A) to (D) for determining the fragment length of conflicting packets may be used. However, available methods for determining the fragment length of conflicting packets are not limited to (A) to (D).

The parameter determination unit 110 outputs the determined packet interval of the conflicting traffic and fragment length of the conflicting packets to the read control unit 105 and packet dividing unit 111, respectively. When the conflict probability of synchronization messages becomes lower than the second threshold, the parameter determination unit 110 outputs Reset Packet Interval to the read control unit 105 and instructs the packet dividing unit 111 to stop dividing packets.

When the fragment length of conflicting packets is received as input from the parameter determination unit 110, the packet dividing unit 111 divides the conflicting packets to be stored in the non-priority class queue 106n into a packet length equal to or smaller than the fragment length. Subsequently, the conflicting packets after division are read by the selector 107 at the packet intervals determined by the parameter determination unit 110. The packet dividing unit 111 is an example of a "dividing unit."

Figure 14:
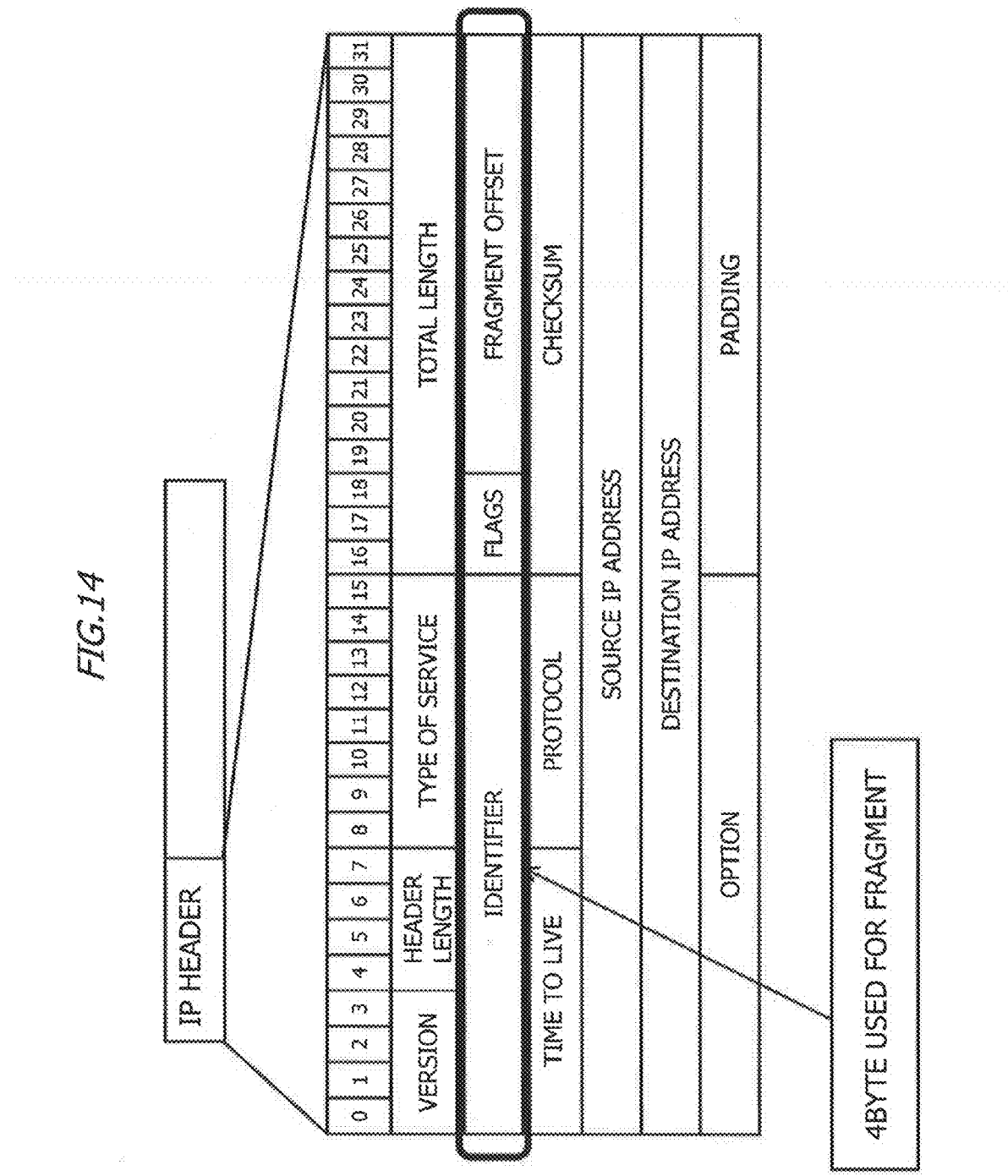
FIG. 14 is a diagram illustrating IP header fields related to fragments.

FIG. 14 is a diagram illustrating IP header fields related to fragments. The IP header contains three fields—identifier, flags, and fragment offset—for a total of four bytes, storing information about fragments. The identifier stores a predetermined value for use to identify an IP packet. Therefore, the identifier fields of plural fragment packets obtained by dividing a same packet contain identical values.

The flags field is a 3-bit field. The first bit, which is unused, contains "0." The second bit indicates Division Enabled when containing "0" and indicates Division Disabled when containing "1." The third bit, when containing "0," indicates that the given packet has not been divided or is the last fragment of a divided packet. When containing "1," the third bit indicates that the given packet is followed by another packet resulting from division, i.e., the given packet is an intermediate packet.

The fragment offset field contains a value in octets, indicating the location of the given packet in the original IP packet. For example, a value of "1" in the fragment offset field indicates the eighth byte and a value of "2" indicates the sixteenth byte. That is, the fragment offset field indicates which byte of the original IP packet the given packet begins at. If the given packet is the first packet, the fragment offset field contains "0."

The receiver side restores the original packet from the fragmented packets as follows. First, based on the value of the identifier field, the receiver side recognizes fragmented packets which make up one set of original data. Next, based on the value of the offset field in the IP header of each fragmented packet, the receiver side recognizes in what part of the original data the data of the fragment has been located. Based on the values of the flags fields, the receiver side recognizes the last fragmented packet and assembles the collected packets into the original data.

When dividing a conflicting packet, the packet dividing unit 111 sets values in the identifier, flags, and fragment offset fields of the IP header so that the receiver-side apparatus can reassemble the divided conflicting packet.

Incidentally, when a PTP message is used on layer 2, unlike the IP header, the MAC header is not provided with a field for use to store fragment information. Therefore, the packet dividing unit 111 adds, for example, identifier, flags, and fragment offset fields of four bytes between sender MAC address and type fields in the MAC header (see FIG. 9) as in the case of the IP header to guarantee that the receiver-side can assemble the fragment packets.

Regarding a process flowchart of the QoS unit 10b according to the second embodiment, the flowcharts illustrated in FIGS. 11A and 11B apply correspondingly. However, in the second embodiment, in addition to the packet interval of conflicting traffic, fragment length is determined in OP4 in FIG. 11A.

In the second embodiment, in addition to the packet interval of conflicting traffic, fragment length is adjusted. This makes it possible to keep the time taken to read each conflicting packet, i.e., the time during which one conflicting packet is read exclusively, to or below a predetermined value. Also, when conflicting packets with a long packet length are divided, read intervals of the conflicting packets are increased. Consequently, even if there is conflicting traffic on the rely device, it is possible to further reduce the occurrence probability of synchronization-message conflict, making it easy for the PTP slave device to secure a number of conflict-free synchronization messages. This makes it possible to improve the accuracy of packet-based time/frequency synchronization.

<Third Embodiment>

The PTP makes it possible to send synchronization messages periodically from a master device. According to the third embodiment, the rely device estimates period of synchronization messages and adjusts the packet interval according to the period of synchronization messages. Again, in the third embodiment, description overlapping with the first and second embodiments will be omitted.

Figure 15:
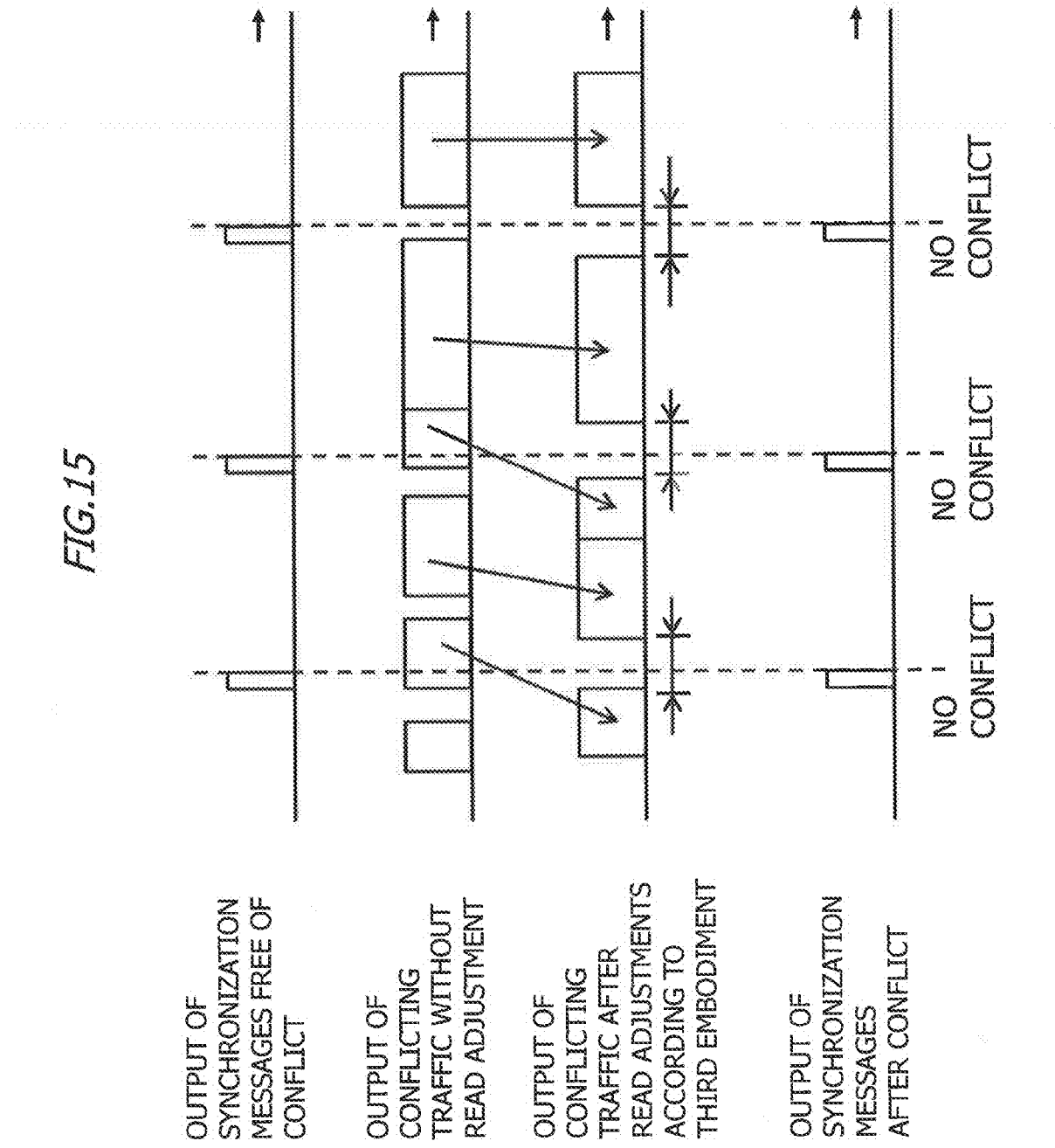
FIG. 15 is a diagram for explaining a read adjustment method for conflicting packets according to a third embodiment.

FIG. 15 is a diagram for explaining a read adjustment method for conflicting packets according to a third embodiment. As in the case of FIG. 5, FIG. 15 illustrates output of synchronization messages free of conflict, output of conflicting traffic without any read adjustment, output of conflicting packets after read adjustments according to the third embodiment, and output of synchronization messages after a conflict according to the third embodiment.

According to the third embodiment, the rely device estimates the period of synchronization messages as well as the presence or absence of synchronization-message conflict and estimates the reception timing of synchronization massages. When the conflict probability of synchronization messages becomes equal to or higher than the first threshold, the rely device provides a predetermined packet interval for conflicting traffic according to the estimated reception timing (see output of synchronization messages after read adjustments in FIG. 15). By estimating the period of synchronization messages and providing a packet interval according to the reception timing, it is possible to avoid a situation in which one conflicting packet is read exclusively during reception of the synchronization messages (see the output of synchronization messages after conflict in FIG. 15). That is, synchronization-message conflict can be avoided.

Figure 16:
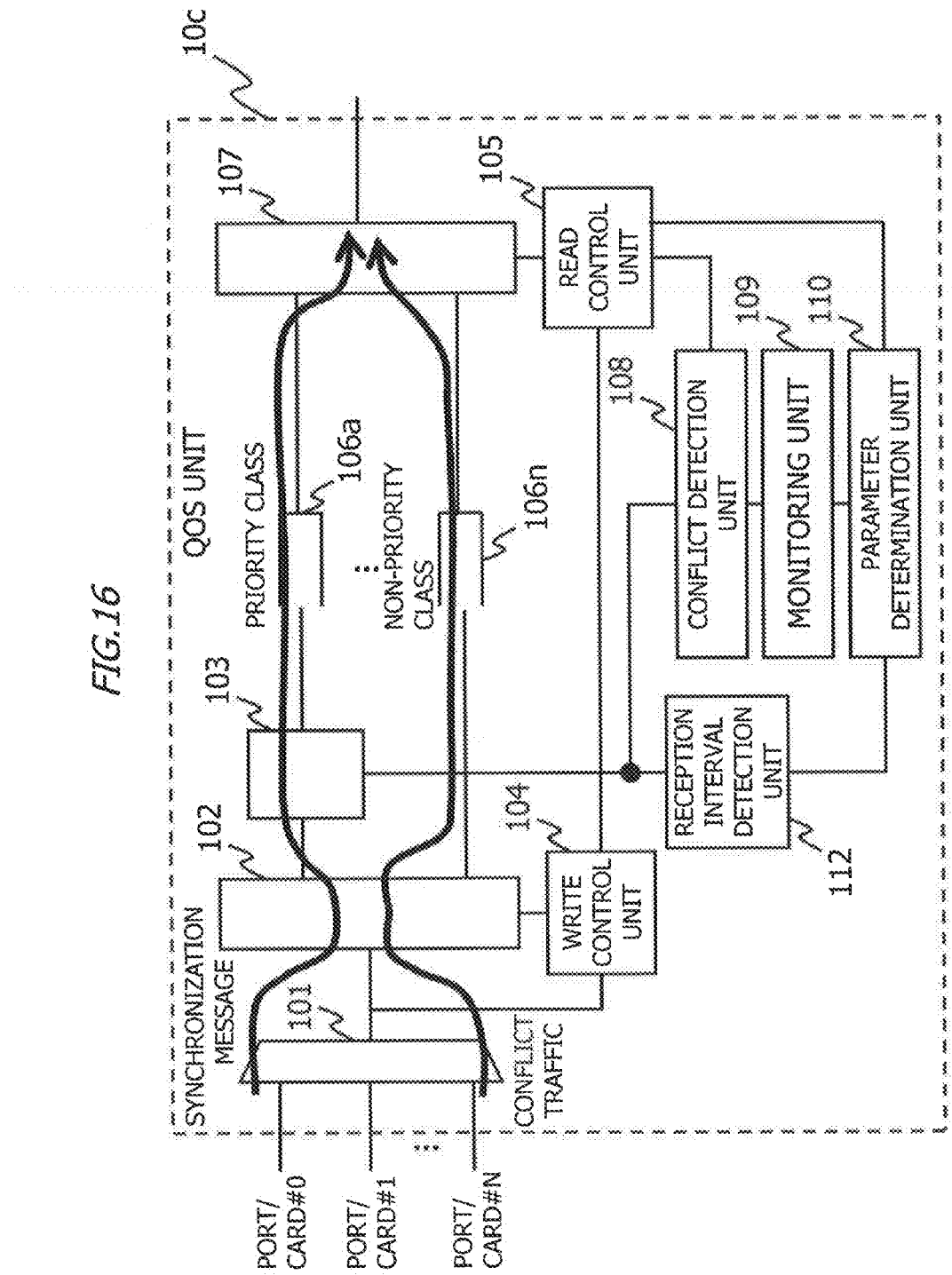
FIG. 16 is an exemplary functional block diagram of a QoS unit according to the third embodiment.

FIG. 16 is an exemplary functional block diagram of a QoS unit 10c according to the third embodiment. In addition to the functional blocks of the QoS unit 10a according to the first embodiment, the QoS unit 10c further includes a reception interval detection unit 112.

The reception interval detection unit 112 receives synchronization messages as input from the synchronization message identification unit 103 and monitors reception intervals among synchronization messages. The PTP stipulates 32 messages per second, 64 messages per second, 128 messages per second, and so on as frequencies of synchronization messages, and any of the stipulated frequencies is used. The reception interval detection unit 112 estimates the period in use among the stipulated periods by, for example, collecting statistics of durations of reception intervals among synchronization messages, and measuring the number of synchronization messages received per second, and estimates the reception timing of synchronization messages. The reception interval detection unit 112 outputs the estimated reception timing of synchronization messages to the parameter determination unit 110. The reception timing of synchronization messages is estimated regularly. The reception interval detection unit 112 is an example of an "estimation unit."

When the conflict probability of synchronization messages received as input from the monitoring unit 109 becomes equal to or higher than the first threshold, the parameter determination unit 110 determines the packet interval of conflicting traffic and outputs the packet interval of conflicting traffic and reception timing of synchronization messages to the read control unit 105. The reception timing of synchronization messages may be specified based on the time managed by the rely device 100: for example, receive a synchronization message at time x and subsequently receive synchronization messages every y seconds. Alternatively, the reception timing may be specified based on an elapsed time duration from the present time: for example, receive a synchronization message after α seconds and subsequently receive synchronization messages every β seconds. Also, the reception timing may be specified based on a clock count: for example, receive a synchronization message after m clock pulses and subsequently receive synchronization messages every n clock pulses. Incidentally, when the conflict probability of synchronization messages becomes lower than the second threshold, the parameter determination unit 110 outputs Reset Packet Interval to the read control unit 105.

In addition to the above-described (1) method which uses a predetermined amount, (2) method which increases gradually from a predetermined amount, and (3) method which uses a table, available packet interval determination methods according to the third embodiment include, for example, (4B) a method which uses a predetermined conversion formula f(x,y), where a variable x is the probability of no conflict and a variable y is a reception period of synchronization messages.

Relationships among the packet interval, the reception period of synchronization messages, and the conflict probability are defined in the table in (3) and conversion formula in (4B), for example, such that the higher the conflict probability, the larger the packet interval of conflicting traffic will be and/or that the longer the reception period of synchronization messages, the larger the packet interval will be. Any of the packet interval determination methods (1) to (4B) may be used. However, available packet interval determination methods are not limited to (1) to (4B).

The read control unit 105 instructs the selector 107 to read conflicting traffic out of the non-priority class queue 106n, based on the reception timing of synchronization messages and packet interval of the conflicting traffic accepted as input from the parameter determination unit 110. That is, the read control unit 105 controls the reading of the conflicting traffic such that an interval larger than the packet interval determined by the parameter determination unit 110 will be provided around the reception timing of synchronization messages. The read control unit 105 recognizes the packet lengths of the conflicting packets stored in the non-priority class queue 106n, based on input from the write control unit 104. Therefore, regarding each conflicting packet, the read control unit 105 judges whether or not reading will be completed, for example, before the reception timing of a next synchronization message occurs. If it is judged that the reading will not be completed, the conflicting packet waits to be read until after the reception timing of the next synchronization message ends and the packet interval elapses.

Regarding a process flowchart of the QoS unit 10c according to the third embodiment, the flowcharts illustrated in FIGS. 11A and 11B apply correspondingly. However, in the third embodiment, in FIG. 11A, the reception interval between synchronization messages is estimated in parallel with the judgment as to the presence or absence of synchronization-message conflict in OP11 and calculation of the conflict probability in OP12.

According to the third embodiment, by estimating the period and reception timing of synchronization messages, synchronization-message conflict is avoided. Consequently, even if there is conflicting traffic on the rely device, it is possible to further reduce the occurrence probability of synchronization-message conflict, making it easy for the PTP slave device to secure a number of conflict-free synchronization messages. This makes it possible to improve the accuracy of packet-based time/frequency synchronization.

<Fourth Embodiment>

According to a fourth embodiment, the rely device adjusts the packet interval and packet length of conflicting traffic, estimates the reception intervals among synchronization messages, and thereby reduces the conflict probability of synchronization packets. That is, the fourth embodiment is a combination of the second and third embodiments.

Figure 17:
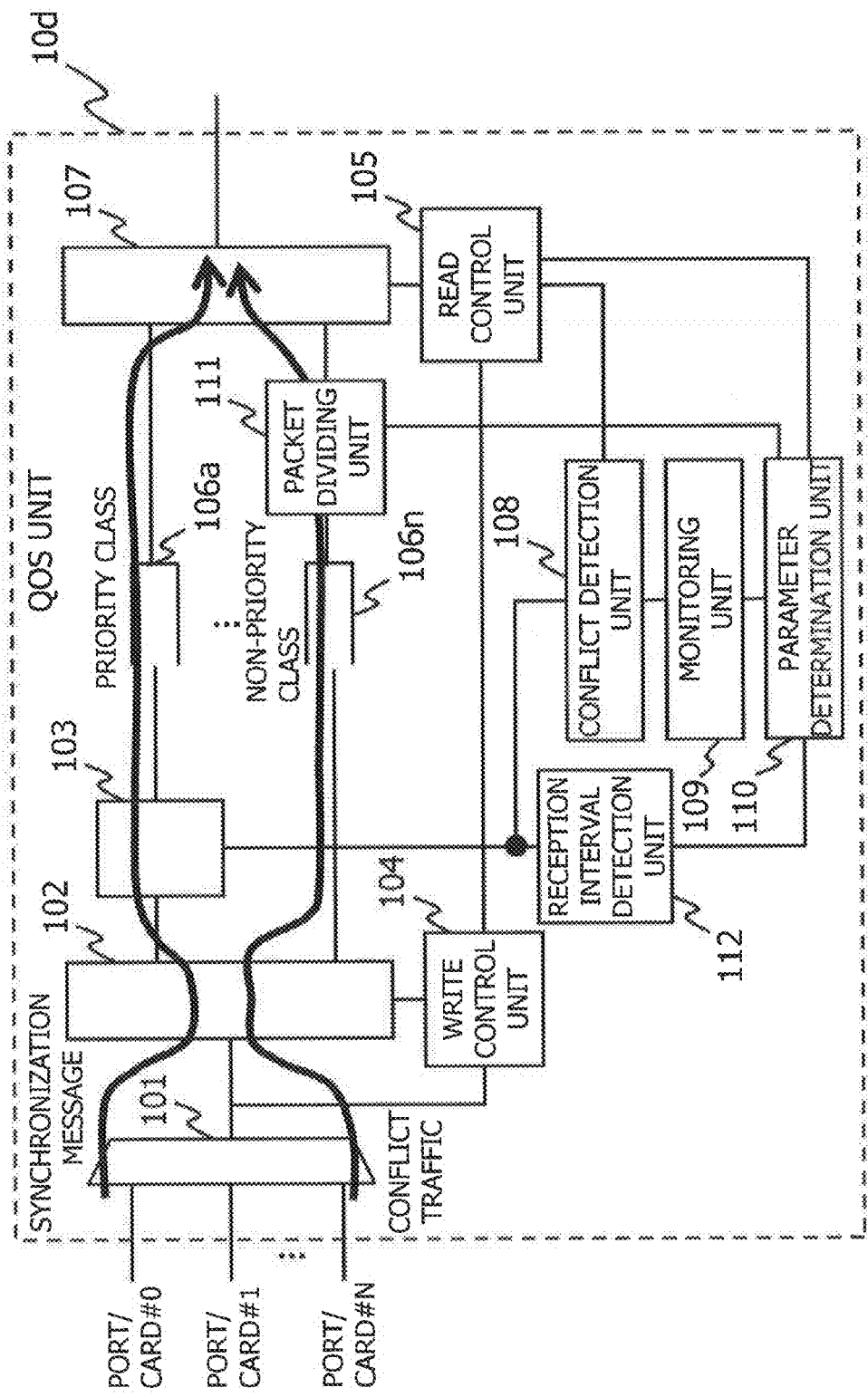
FIG. 17 is an exemplary functional block diagram of a QoS unit according to a fourth embodiment.

FIG. 17 is an exemplary functional block diagram of a QoS unit 10d according to the fourth embodiment. In addition to the functional blocks of the QoS unit 10a according to the first embodiment, the QoS unit 10d further includes the packet dividing unit 111 and reception interval detection unit 112. Regarding processes of the packet dividing unit 111 and reception interval detection unit 112, the second and third embodiments apply correspondingly, and thus description thereof will be omitted.

When the conflict probability of synchronization messages becomes equal to or higher than the first threshold, the parameter determination unit 110 determines the packet interval and fragment length of conflicting traffic. The parameter determination unit 110 outputs the determined packet interval and the reception timing of synchronization messages to the read control unit 105. Regarding the packet interval determination methods for conflicting packets according to the fourth embodiment, for example, the methods according to the third embodiment apply correspondingly. Also, the fragment length of conflicting traffic according to the fourth embodiment may be determined not only by the above-described methods: (A) the method which uses a predetermined length; (B) the method which increases the fragment length gradually; and (C) the method which uses a table, but also by (D2) a method which uses a predetermined conversion formula $g(x,y,f(x,y))$, where a variable x is the probability of no synchronization-message conflict, a variable y is the reception period of synchronization messages, and $f(x,y)$ is the packet interval of conflicting traffic.

Relationships among the fragment length, conflict probability, reception period of synchronization messages, and packet interval are defined in the table in (C) and conversion formula in (D2), for example, such that the higher the conflict probability, the smaller the fragment length will be, that the larger the packet interval of conflicting traffic, the larger the fragment length will be, and that the longer the reception period of synchronization messages, the shorter the fragment length will be. Any of the fragment length determination methods (A) to (D2) for conflicting packets may be used. However, available fragment length determination methods for conflicting packets are not limited to (A) to (D2).

The parameter determination unit 110 outputs the determined fragment length to the packet dividing unit 111. Also, when the conflict probability of synchronization messages becomes lower than the second threshold, the parameter determination unit 110 instructs the read control unit 105 to reset the packet interval, and the packet dividing unit 111 to stop dividing packets.

According to the fourth embodiment, the rely device adjusts the packet length of conflicting traffic and provides a packet interval for the conflicting traffic in accordance with the reception timing of synchronization messages. This makes it possible to further reduce occurrence probability of synchronization-message conflict, making it easy for the PTP slave device to secure a predetermined number of conflict-free synchronization messages.

<Fifth Embodiment>

According to a fifth embodiment, the packet interval of conflicting traffic is adjusted by adjacent nodes in cooperation with each other. Again, in the fifth embodiment, description in common with the first to fourth embodiments will be omitted.

Figure 18:
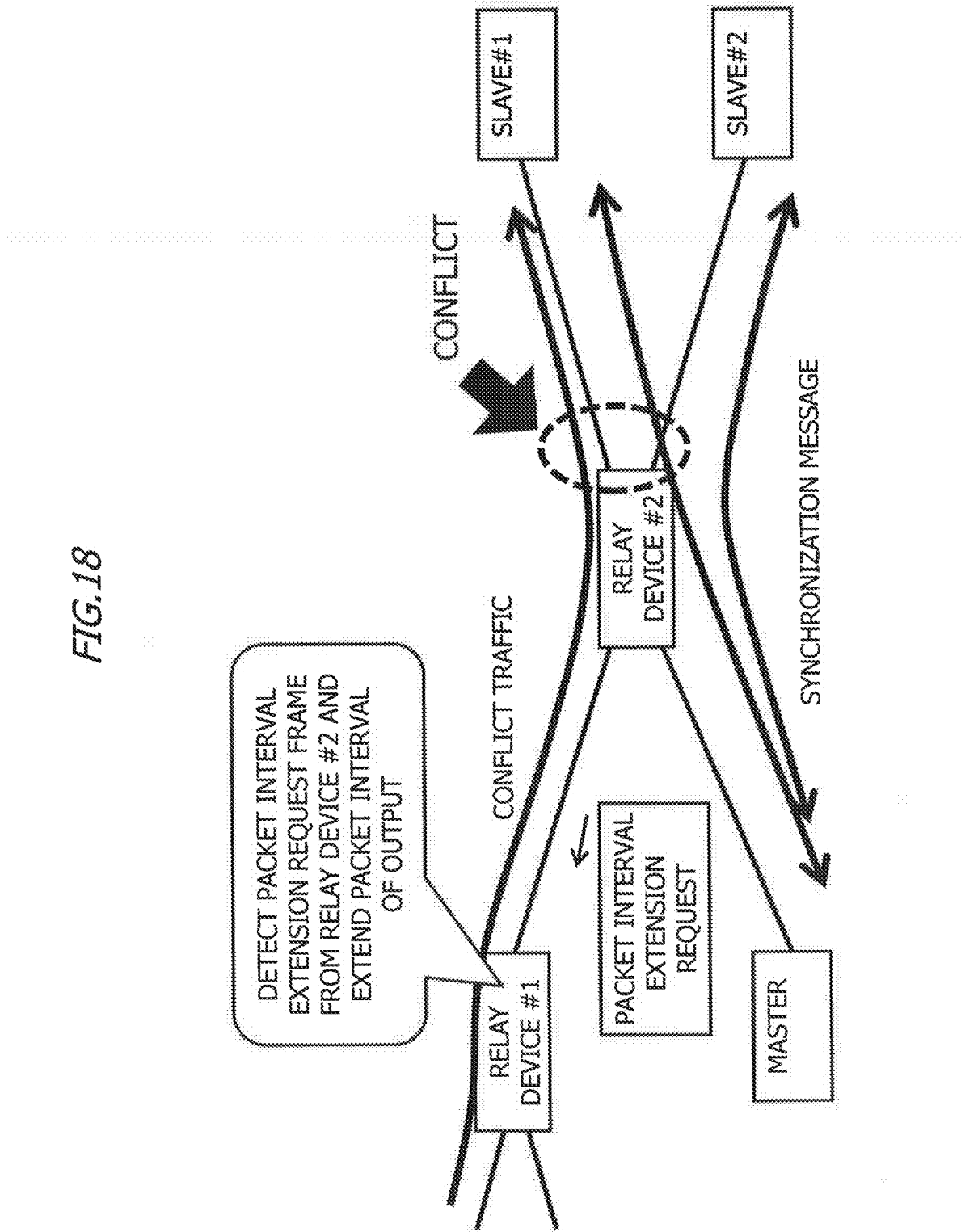
FIG. 18 is a diagram illustrating one application example 1 of a fifth embodiment.

FIG. 18 is a diagram illustrating one application example 1 of the fifth embodiment. In application example 1, there are a PTP master and PTP slaves #1 and #2, and rely device #2 exists between the PTP master and PTP slaves #1 and #2. Rely device #1 is a node adjacent to rely device #2 and is located upstream of rely device #2 along conflicting traffic. The conflicting traffic flows from rely device #1 to rely device #2. Also, at that port of rely device #2 which is connected to PTP slave #2, the synchronization messages sent from the PTP master to the PTP slave conflict with the conflicting traffic (in dotted circle in FIG. 18).

As in the case of the first embodiment, rely device #2 monitors for any synchronization-message conflict, and determines the packet interval of conflicting traffic when the conflict probability of synchronization messages becomes equal to or higher than the first threshold. Next, rely device #2 generates a control packet containing the determined packet interval and sends the control packet to rely device #1 located upstream along the conflicting traffic (packet interval extension request in FIG. 18). Rely device #1 detects the control packet, extends the packet interval as specified in the control packet, and sends out the conflicting traffic. Incidentally, when the PTP master sends out or transfers conflicting traffic, the PTP master detects a control packet containing a packet interval, extends the packet interval as specified in the control packet, and sends out the conflicting traffic, as in the case of rely device #1.

Figure 19:
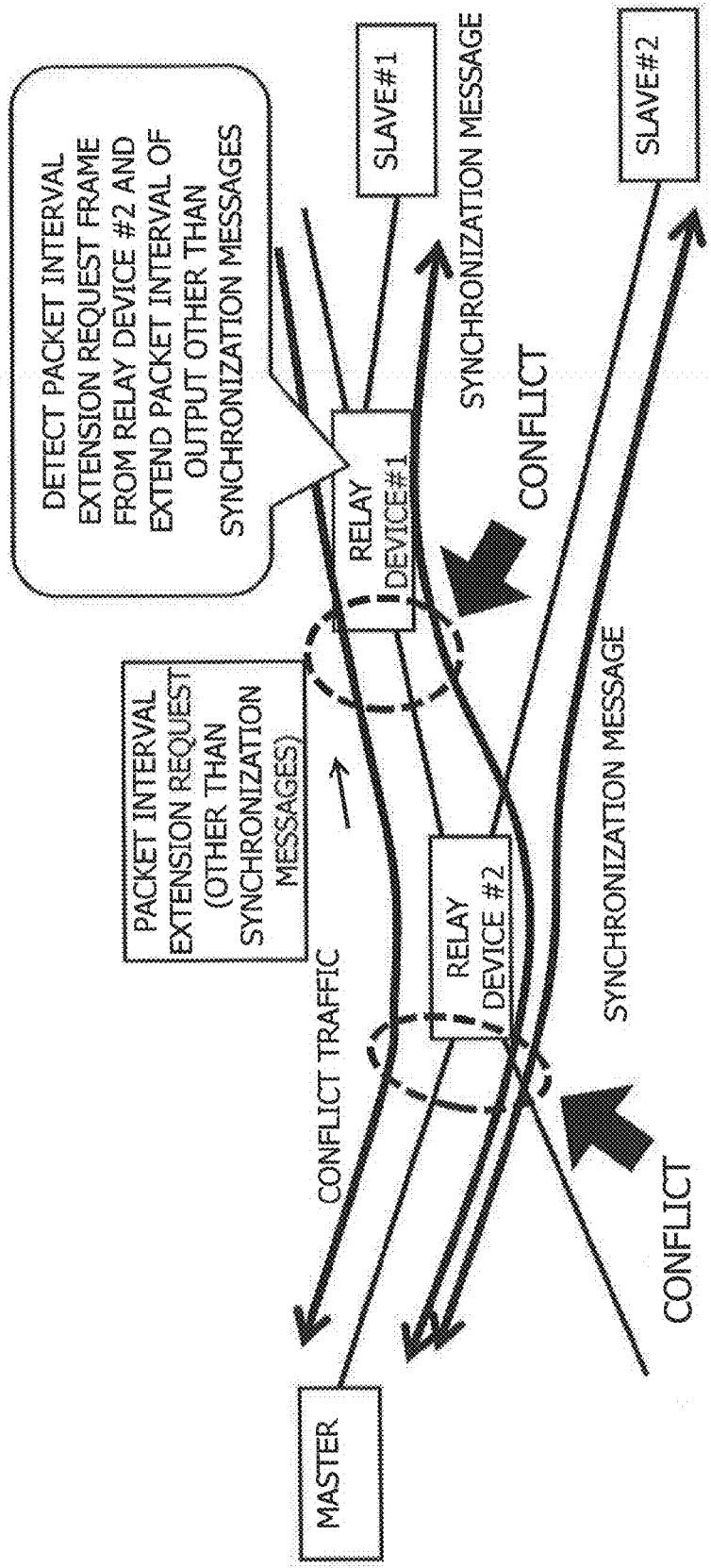
FIG. 19 is a diagram illustrating application example 2 of the fifth embodiment.

FIG. 19 is a diagram illustrating application example 2 of the fifth embodiment. Again, in application example 2, there are a PTP master and PTP slaves #1 and #2, and rely device #2 exists between the PTP master and PTP slaves #1 and #2. Rely device #1 is a node adjacent to rely device #2 and is located upstream of rely device #2 along conflicting traffic. That is the conflicting traffic flows from rely device #1 to rely device #2. However, in application example 2, while being located upstream of rely device #2 along conflicting traffic, rely device #1 is located on the side of the PTP slaves.

Also, at that port of rely device #1 which is connected to rely device #2, the synchronization messages sent from PTP slave #1 to the PTP master conflict with the conflicting traffic. Also, at that port of rely device #2 which is connected to the PTP master, the synchronization messages sent from PTP slave #2 to the PTP master conflict as well.

In application example 2, as in the case of the first embodiment, rely device #2 monitors for any synchronization-message conflict at a connection port for connection with the PTP master, and determines the packet interval of conflicting traffic when the conflict probability of synchronization messages becomes equal to or higher than the first threshold. Rely device #2 sends a control packet containing the determined packet interval to rely device #1, requesting rely device #1 to expand the packet interval of conflicting traffic (packet interval extension request in FIG. 19). At this time, however, the packet sent from rely device #1 to rely device #2 also contains a synchronization message sent from PTP slave #1 to the PTP master, and consequently there could be a delay in the synchronization message. Therefore, the control packet contains instructions to expand the packet interval for packets other than the synchronization message. Rely device #1 detects the control packet, extends the packet interval as specified in the control packet except for the synchronization message, and sends out the traffic. Incidentally, in application example 2, when the PTP slave sends out or transfers conflicting traffic, the PTP slave detects a control packet containing a packet interval, extends the packet interval as specified in the control packet, and sends out the conflicting traffic, as in the case of rely device #1.

Figure 20:
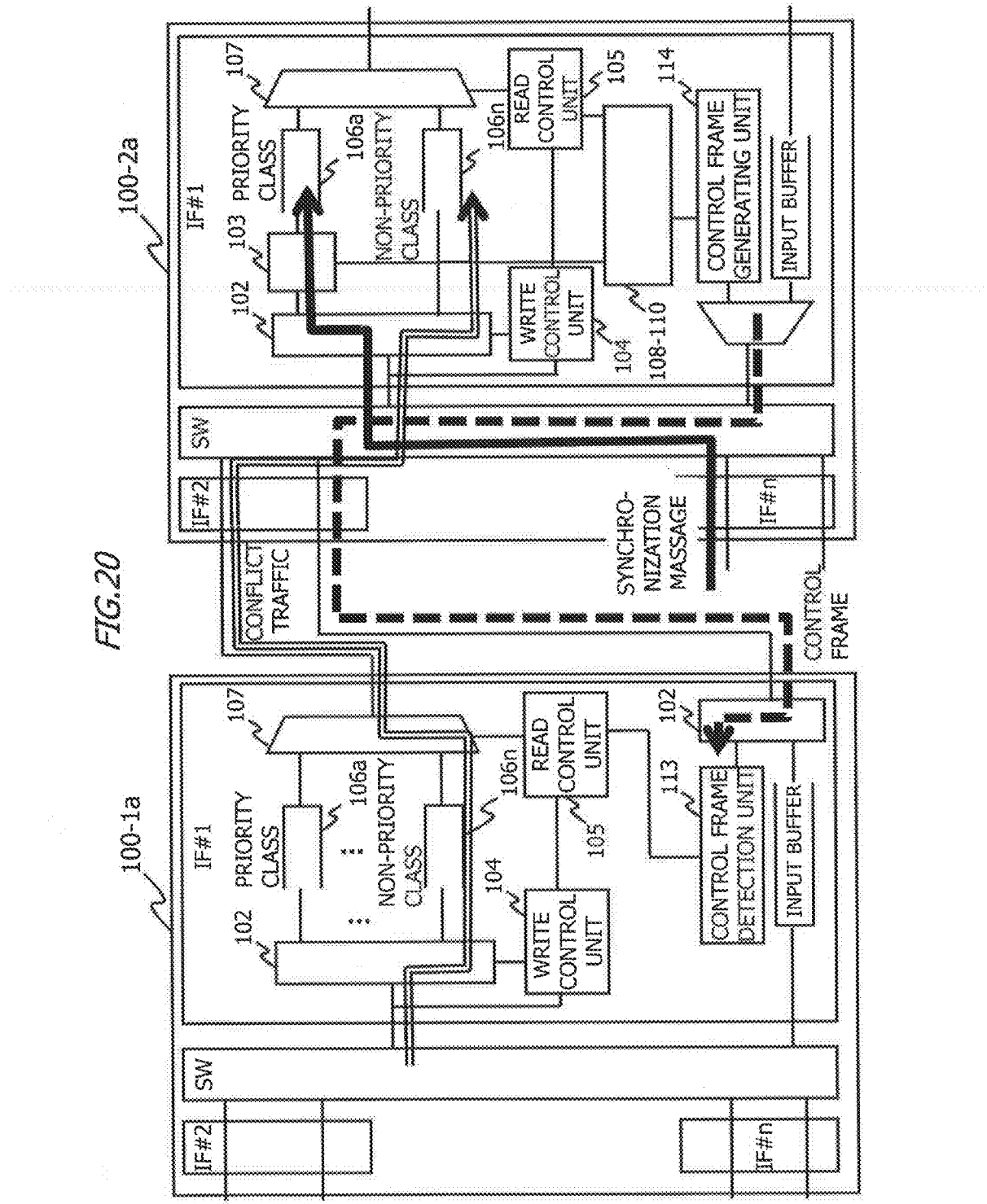
FIG. 20 is a diagram illustrating a configuration example of rely devices according to the fifth embodiment.

FIG. 20 is a diagram illustrating a configuration example of rely devices according to the fifth embodiment. Rely devices 100-1a and 100-2a in FIG. 20 correspond, for example, to rely devices #1 and #2 in application examples 1 and 2, respectively. Also, FIG. 20 predominantly illustrates functional blocks according to the fifth embodiment and other functional blocks are either simplified or omitted. The rely device 100-1a is an example of a "first node." The rely device 100-1a is an example of a "second node."

IF cards of the rely device 100-2a further include a control frame generating unit 114 in addition to the components of the QoS unit 10a according to the first embodiment. In FIG. 20, for the sake of convenience, the conflict detection unit 108, monitoring unit 109, and parameter determination unit 110 are illustrated as a single block in a simplified manner. According to the fifth embodiment, when the conflict probability of synchronization messages becomes equal to or higher than the first threshold, the parameter determination unit 110 determines the packet interval of conflicting traffic and outputs the packet interval to the control frame generating unit 114.

Upon receiving the packet interval of conflicting traffic as input from the parameter determination unit 110, the control frame generating unit 114 generates a control frame containing the packet interval. The control frame is a frame which requests the receiver-side apparatus to expand the packet interval of traffic other than synchronization packets to a specified packet interval. The control frame generating unit 114 outputs the generated control frame through a reception port for conflicting traffic (port of IF card #2 of the rely device 100-2a in FIG. 20). The control frame is sent as a frame, such as an Ethernet (registered trademark) Pause frame, which is not transferred beyond a node, using a multicast address or broadcast address. The control frame is sent to a processing unit (omitted in FIG. 20) on an input side of the IF card and outputted via an SW card and IF card #2. The control frame generating unit 114 is an example of a "sending unit."

An IF card of the rely device 100-1a, which receives the control frame, includes a control frame detection unit 113 provided in an input-side processing unit (omitted in FIG. 20). The input-side processing unit includes, for example, a multiplexing unit, a selector, an input buffer, a write control unit, and a read control unit as in the case of the output side, and the control frame is outputted to the control frame detection unit 113 by the write control unit.

Upon receiving a control frame as input, the control frame detection unit 113 instructs the read control unit 105 of an output-side processing unit to read conflicting traffic (traffic other than synchronization messages) at intervals equal to or higher than the packet interval contained in the control frame. Consequently, the rely device located upstream along the conflicting traffic sends out conflicting traffic at intervals equal to or larger than the specified packet interval. The control frame detection unit 113 is an example of a "receiving unit."

Incidentally, when the conflict probability of synchronization messages becomes lower than the second threshold, the parameter determination unit 110 of the rely device 100-2a outputs Reset Packet Interval to the control frame generating unit 114. Upon receiving Reset Packet Interval as input from the parameter determination unit 110, the control frame generating unit 114 generates a control frame containing Reset Packet Interval and sends the control frame through a reception port for conflicting traffic. The control frame containing Reset Packet Interval is detected by the control frame detection unit 113 of the rely device 100-1a. Upon detecting the control frame containing Reset Packet Interval, the control frame detection unit 113 instructs the read control unit 105 to reset the packet interval.

According to the fifth embodiment, when the conflict probability of synchronization messages becomes equal to or higher than the first threshold, the rely device 100-2a determines the packet interval of conflicting traffic and requests the rely device 100-1a which is an adjacent node located upstream along the conflicting traffic to expand the packet interval. Consequently, the packet interval of the conflicting traffic is adjusted on the rely device 100-1a which is an adjacent upstream node, allowing the conflict probability of synchronization messages to be lowered on the rely device 100-2a. Also as processes related to the adjustment of the packet interval of the conflicting traffic are shared with the rely device 100-1a which is an adjacent node, the processing load on the rely device 100-2a is lightened.

<Sixth Embodiment>

According to a sixth embodiment, in addition to the adjustment of the packet interval of conflicting traffic, the packet length of the conflicting traffic is adjusted by adjacent nodes in cooperation with each other. Again, in the sixth embodiment, description in common with the first to fifth embodiments will be omitted.

Figure 21:
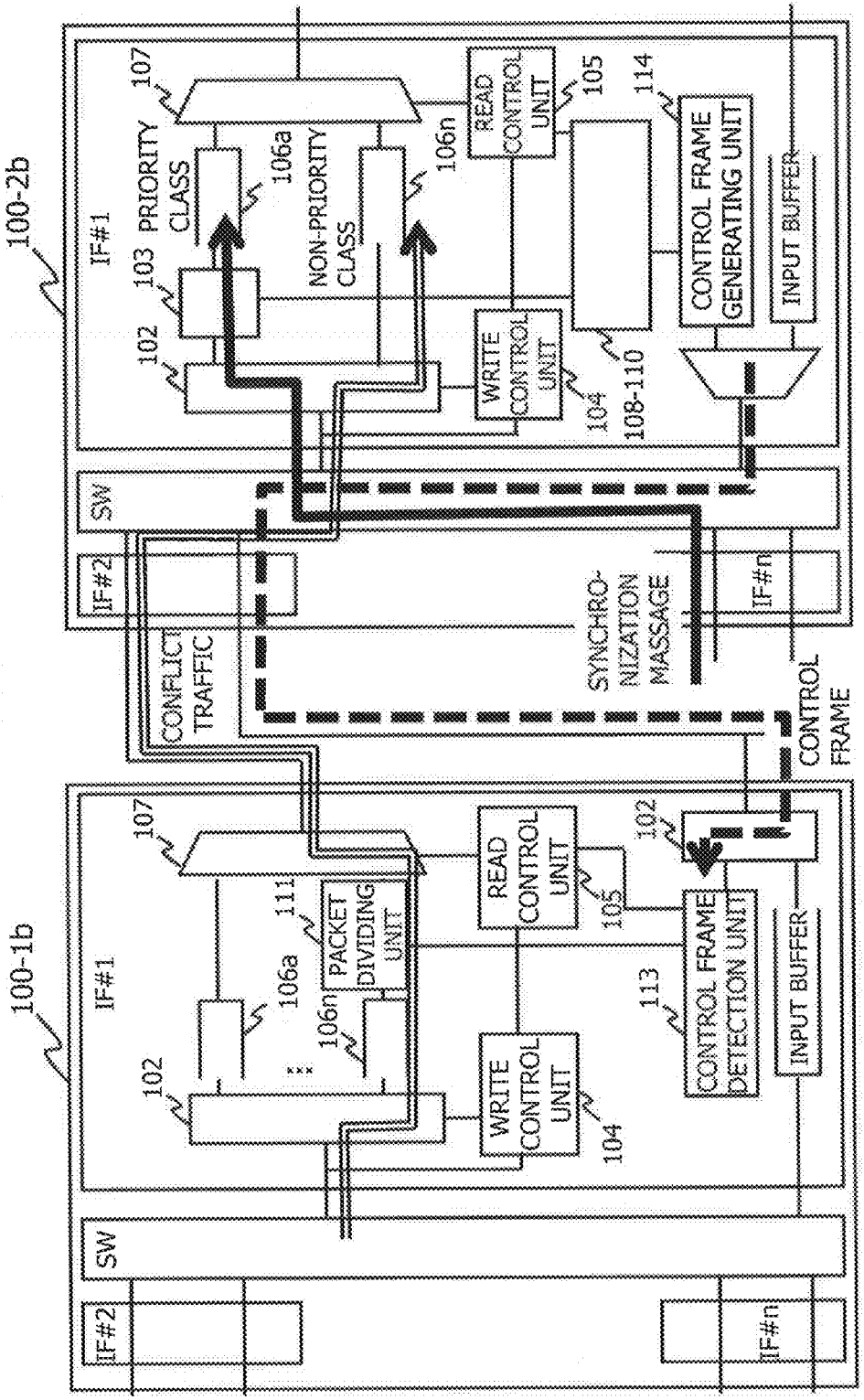
FIG. 21 is a diagram illustrating a configuration example of rely devices according to a sixth embodiment.

FIG. 21 is a diagram illustrating a configuration example of rely devices according to the sixth embodiment. Rely devices 100-1b and 100-2b in FIG. 21 correspond, for example, to rely devices #1 and #2 in application example 1 in FIG. 18 and application example 2 in FIG. 19, respectively. Also, FIG. 21 predominantly illustrates functional blocks according to the sixth embodiment and other functional blocks are either simplified or omitted. In FIG. 21, for the sake of convenience, the conflict detection unit 108, monitoring unit 109, and parameter determination unit 110 of the rely device 100-2b are illustrated as a single block in a simplified manner.

According to the sixth embodiment, when the conflict probability of synchronization messages becomes equal to or higher than the first threshold, the parameter determination unit 110 of the rely device 100-2b determines fragment length in addition to the packet interval of conflicting traffic and outputs the packet interval and fragment length to the control frame generating unit 114.

Upon receiving the packet interval and fragment length of the conflicting traffic as input from the parameter determination unit 110, the control frame generating unit 114 generates a control frame containing the packet interval and fragment length. In this case, the control frame is a frame which requests the receiver-side apparatus to set the packet interval and fragment length of traffic other than synchronization packets to a specified packet interval and fragment length. The control frame generating unit 114 outputs the generated control frame through a reception port for conflicting traffic (port of IF card #2 of the rely device 100-2b in FIG. 21).

In addition to the functional blocks according to the fifth embodiment, the rely device 100-1b further includes the packet dividing unit 111. According to the sixth embodiment, upon detecting the control frame, the control frame detection unit 113 of the rely device 100-1b extracts the packet interval and fragment length of the conflicting traffic from the control frame. The control frame detection unit 113 outputs the packet interval and fragment length of the conflicting traffic to the read control unit 105 and packet dividing unit 111, respectively.

Upon receiving the fragment length as input from the control frame detection unit 113, the packet dividing unit 111 divides the packets stored in the non-priority class queue 106n into a packet length equal to or smaller than the fragment length. Subsequently, on instructions from the read control unit 105, fragmented packets to be stored in the non-priority class queue 106n are read. Incidentally, when dividing a packet, the packet dividing unit 111 stores fragment-related information contained in the header as in the case of the packet dividing unit 111 according to the second embodiment (see FIG. 14). Consequently, on the rely device located upstream along the conflicting traffic between adjacent nodes, packets are divided into sizes equal to or smaller than the specified packet length and the conflicting traffic is sent out at intervals equal to or larger than the specified packet interval.

Incidentally, when the conflict probability of synchronization messages becomes lower than the second threshold, the parameter determination unit 110 of the rely device 100-2b outputs Reset Packet Interval and Stop Packet Division to the control frame generating unit 114. Upon receiving Reset Packet Interval and Stop Packet Division as input from the parameter determination unit 110, the control frame generating unit 114 generates a control frame containing Reset Packet Interval and Stop Packet Division and sends the control frame through a reception port for conflicting traffic. The control frame containing Reset Packet Interval and Stop Packet Division is detected by the control frame detection unit 113 of the rely device 100-1b. Upon detecting the control frame containing Reset Packet Interval and Stop Packet Division, the control frame detection unit 113 instructs the read control unit 105 to reset the packet interval, and the packet dividing unit 111 to stop dividing packets.

According to the sixth embodiment, when the conflict probability of synchronization messages becomes equal to or higher than the first threshold, the rely device 100-2b determines the fragment length in addition to the packet interval of conflicting traffic and requests the rely device 100-1b which is an adjacent node located upstream along the conflicting traffic to expand the packet interval and divide the packets. Consequently, the packet interval and packet length of the conflicting traffic are adjusted on the rely device 100-1b which is an adjacent upstream node, allowing the conflict probability of synchronization messages to be lowered on the rely device 100-2b. Also, as processes related to the adjustment of the packet interval and packet length of the conflicting traffic are shared with the rely device 100-1b which is an adjacent node, the processing load on the rely device 100-2b is lightened.

<Seventh Embodiment>

According to a seventh embodiment, the packet interval of conflicting traffic is adjusted by adjacent nodes in cooperation with each other in accordance with the reception timing of synchronization messages. Again, in the seventh embodiment, description in common with the first to sixth embodiments will be omitted.

Figure 22:
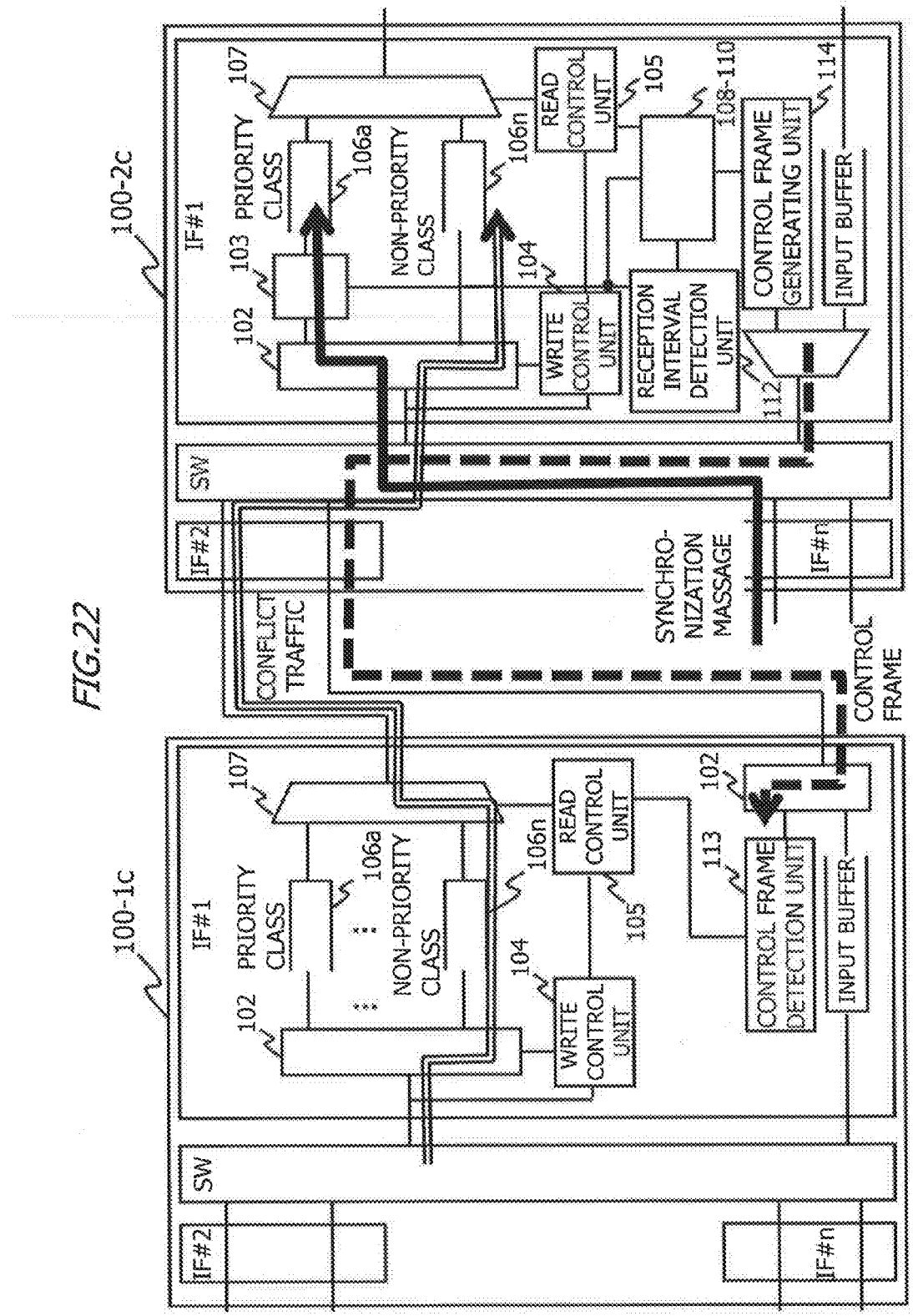
FIG. 22 is a diagram illustrating a configuration example of rely devices according to a seventh embodiment.

FIG. 22 is a diagram illustrating a configuration example of rely devices according to the seventh embodiment. Rely devices 100-1c and 100-2c in FIG. 22 correspond, for example, to rely devices #1 and #2 in application example 1 in FIG. 18 and application example 2 in FIG. 19, respectively. Also, FIG. 22 predominantly illustrates functional blocks according to the seventh embodiment and other functional blocks are either simplified or omitted. In FIG. 22, for the sake of convenience, the conflict detection unit 108, monitoring unit 109, and parameter determination unit 110 of the rely device 100-2c are illustrated as a single block in a simplified manner.

In addition to the functional blocks of the rely device 100-2a according to the fifth embodiment, the rely device 100-2c further includes the reception interval detection unit 112. Regarding processes of the reception interval detection unit 112, those of the third embodiment applies correspondingly. That is, the reception interval detection unit 112 estimates the period and reception timing of synchronization messages. The reception interval detection unit 112 outputs the reception timing to the parameter determination unit 110.

When the conflict probability of synchronization messages becomes equal to or higher than the first threshold, the parameter determination unit 110 determines the packet interval of conflicting traffic and outputs the determined packet interval together with the reception timing of synchronization messages to the control frame generating unit 114. Regarding the packet interval determination methods for conflicting traffic, for example, the methods according to the third embodiment apply correspondingly.

Upon receiving the packet interval of conflicting traffic and reception timing of synchronization messages as input from the parameter determination unit 110, the control frame generating unit 114 generates a control frame containing the packet interval and reception timing. In this case, the control frame is a frame which requests the receiver-side apparatus to set the packet interval of traffic other than synchronization packets so as to conform to the specified timing. The control frame generating unit 114 outputs the generated control frame through a reception port for conflicting traffic (port of IF card #2 of the rely device 100-2c in FIG. 22). Incidentally, the reception timing of synchronization messages contained in the control frame is set by taking into consideration a transfer delay between the rely devices 100-1c and 100-2c. Also, the control frame may be sent periodically from the rely device 100-1c at a period equal to the period of synchronization messages estimated by the reception interval detection unit 112 or may be sent once by including the period of synchronization messages in the control frame when the conflict probability of synchronization messages exceeds the first threshold.

The rely device 100-1c has functional blocks similar to those of the fifth embodiment. According to the seventh embodiment, upon detecting the control frame, the control frame detection unit 113 of the rely device 100-1c extracts the packet interval of conflicting traffic and reception timing of synchronization messages from the control frame. The control frame detection unit 113 outputs the packet interval of conflicting traffic and reception timing of synchronization messages to the read control unit 105. The read control unit 105 reads the conflicting traffic in such a way that the inputted packet interval will conform to the inputted reception timing as in the case of the read control unit 105 according to the third embodiment. Consequently, on the node located upstream along the conflicting traffic between adjacent nodes, the conflicting traffic is sent out at intervals equal to or larger than the specified packet interval with the specified timing.

Incidentally, when the conflict probability of synchronization messages becomes lower than the second threshold, the parameter determination unit 110 of the rely device 100-2c outputs Reset Packet Interval to the control frame generating unit 114. Upon receiving Reset Packet Interval as input from the parameter determination unit 110, the control frame generating unit 114 generates a control frame containing Reset Packet Interval and sends the control frame through a reception port for conflicting traffic. The control frame containing Reset Packet Interval is detected by the control frame detection unit 113 of the rely device 100-1c. Upon detecting the control frame containing Reset Packet Interval, the control frame detection unit 113 instructs the read control unit 105 to reset the packet interval.

According to the seventh embodiment, the rely device 100-2c estimates the reception timing of synchronization messages. When the conflict probability of synchronization messages becomes equal to or higher than the first threshold, the rely device 100-2c determines the packet interval of conflicting traffic and requests the rely device 100-1c which is an adjacent node located upstream along the conflicting traffic to expand the packet interval in accordance with the reception timing of synchronization messages. Consequently, the packet interval of the conflicting traffic and the timing according to which the packet interval is set are adjusted on the rely device 100-1c which is an adjacent upstream node, allowing the conflict probability of synchronization messages to be lowered on the rely device 100-2c. Also, as processes related to the adjustment of the packet interval of the conflicting traffic are shared with the rely device 100-1c which is an adjacent upstream node, the processing load on the rely device 100-2c is lightened.

<Eighth Embodiment>

According to an eighth embodiment, the packet interval and packet length of conflicting traffic are adjusted by adjacent nodes in cooperation with each other in accordance with the reception timing of synchronization messages. Again, in the eighth embodiment, description in common with the first to seventh embodiments will be omitted.

Figure 23:
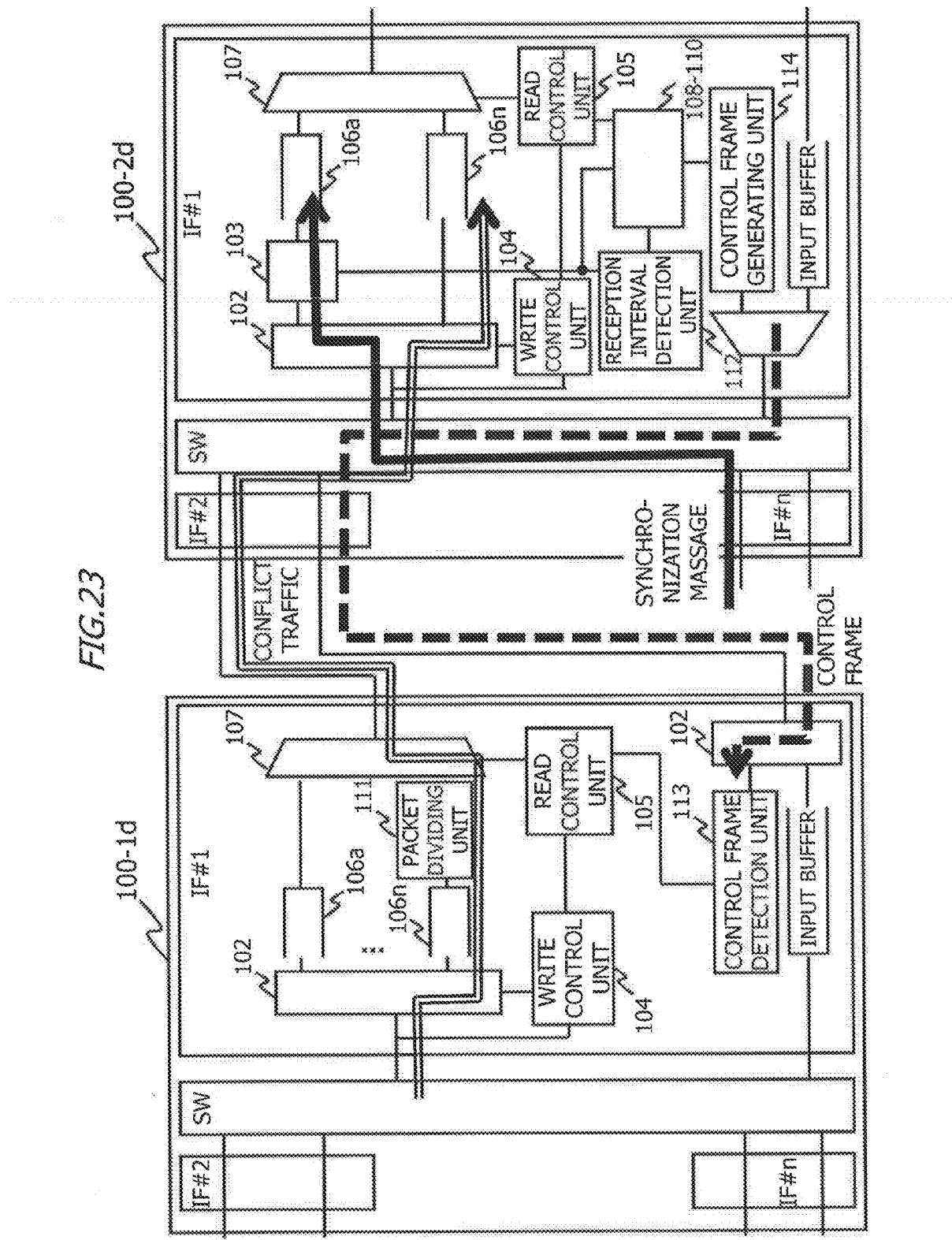
FIG. 23 is a diagram illustrating a configuration example of rely devices according to an eighth embodiment.

FIG. 23 is a diagram illustrating a configuration example of rely devices according to the eighth embodiment. Rely devices 100-1d and 100-2d in FIG. 23 correspond, for example, to rely devices #1 and #2 in application example 1 in FIG. 18 and application example 2 in FIG. 19, respectively. Also, FIG. 23 predominantly illustrates functional blocks according to the eighth embodiment and other functional blocks are either simplified or omitted. In FIG. 23, for the sake of convenience, the conflict detection unit 108, monitoring unit 109, and parameter determination unit 110 of the rely device 100-2d are illustrated as a single block in a simplified manner.

The rely device 100-2d has functional blocks similar to those of the rely device 100-2c according to the seventh embodiment. When the conflict probability of synchronization messages becomes equal to or higher than the first threshold, the parameter determination unit 110 determines the packet interval and fragment length of the conflicting traffic and outputs the determined packet interval and fragment length together with the reception timing of synchronization messages to the control frame generating unit 114. Regarding the packet interval determination methods and fragment length determination methods according to the eighth embodiment, for example, the methods according to the fourth embodiment apply correspondingly.

Upon receiving the packet interval and fragment length of the conflicting traffic and the reception timing of synchronization messages as input from the parameter determination unit 110, the control frame generating unit 114 generates a control frame containing the packet interval, fragment length, and reception timing. In this case, the control frame is a frame which requests the receiver-side apparatus to set the packet interval of traffic other than synchronization packets in accordance with the specified timing and divide the packets into a packet length equal to or smaller than the specified packet length. The control frame generating unit 114 outputs the generated control frame through a reception port for conflicting traffic (port of IF card #2 of the rely device 100-2d in FIG. 23).

The rely device 100-1d has functional blocks similar to those of the sixth embodiment. According to the eighth embodiment, upon detecting the control frame, the control frame detection unit 113 of the rely device 100-1d extracts the packet interval and fragment length of conflicting traffic as well as the reception timing of synchronization messages from the control frame. The control frame detection unit 113 outputs the packet interval of conflicting traffic and reception timing of synchronization messages to the read control unit 105. Also, the control frame detection unit 113 outputs the fragment length to the packet dividing unit 111. Upon receiving the fragment length as input, the packet dividing unit 111 divides the packets to be stored in the non-priority class queue 106n into a packet length equal to or smaller than the inputted fragment length. The read control unit 105 reads the conflicting traffic in such a way that the inputted packet interval will conform to the inputted reception timing. Consequently, on the node located upstream along the conflicting traffic between adjacent nodes, the conflicting traffic is sent out as packets with a length equal to or smaller than the specified packet at intervals equal to or larger than the specified packet interval with the specified timing.

Incidentally, with the rely device 100-2d, when the conflict probability of synchronization messages becomes lower than the second threshold, a control frame containing Reset Packet Interval and Stop Packet Division is generated and sent out to the rely device 100-1d as in the case of the sixth embodiment.

Upon receiving the control frame, the rely device 100-1*d* stops adjusting the packet interval and dividing packets.

According to the eighth embodiment, the rely device 100-2*d* estimates the reception timing of synchronization messages. When the conflict probability of synchronization messages becomes equal to or higher than the first threshold, the rely device 100-2*d* determines the packet interval and fragment length of the conflicting traffic. Furthermore, the rely device 100-2*d* requests the rely device 100-1*d* which is an adjacent node located upstream along the conflicting traffic to expand the packet interval in accordance with the reception timing of synchronization messages and divide conflicting packets into a length equal to or smaller than the fragment length. Consequently, the packet interval of the conflicting traffic, the timing according to which the packet interval is set, and the packet length of the conflicting traffic are adjusted on the rely device 100-1*d* which is an adjacent upstream node, allowing the conflict probability of synchronization messages to be lowered on the rely device 100-2*d*. Also, as processes related to the adjustment of the packet interval and packet length of the conflicting traffic are shared with the rely device 100-1*d* which is an adjacent upstream node, the processing load on the rely device 100-2*d* is lightened.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiments of the present invention have been described in detail, it should be understood that the various changes, substitutions, and alterations could be made hereto without departing from the spirit and scope of the invention.

What is claimed is:

1. A data block output apparatus comprising:
a first queue that stores data blocks of first traffic;
a second queue that stores data blocks of second traffic and is read preferentially over the first queue;
a control unit that controls a data block interval between completion of reading of one data block in the first traffic and a start of reading of a next data block in the first traffic; and
a sending unit that sends the interval controlled by the control unit to an apparatus located upstream along the first traffic.

2. The data block output apparatus according to claim 1, further comprising:
a monitoring unit that monitors for occurrence of data blocks read out of the second queue in wait for completion of reading of a data block from the first queue, wherein
when occurrence frequency of the data blocks read out of the second queue in wait for the completion of the reading of one data block from the first queue is equal to or higher than a predetermined value, the control unit sets a predetermined data block interval between the completion of reading of one data block in the first traffic and the start of reading of the next data block in the first traffic.

3. The data block output apparatus according to claim 2, wherein when the occurrence frequency becomes lower than a second predetermined value, the control unit resets the interval.

4. The data block output apparatus according to claim 1, wherein the control unit controls an upper limit size of one data block stored in the first queue.

5. The data block output apparatus according to claim 4, further comprising a dividing unit that divides the data blocks stored in the first queue so as to be of a size smaller than the upper limit size controlled by the control unit.

6. The data block output apparatus according to claim 1, further comprising an estimation unit that estimates timing of reception of the data blocks of the second traffic, wherein
the control unit controls the interval so as to be set to the estimated timing.

7. The data block output apparatus according to claim 1, further comprising a reading unit that reads data blocks out of the first queue at the intervals controlled by the control unit.

8. A communication system comprising: a first node; and a second node located upstream along first traffic, wherein
the first node comprises:
a first queue that stores data blocks of the first traffic;
a second queue that stores data blocks of second traffic and is read preferentially over the first queue;
a control unit that controls a data block interval between completion of reading of one data block in the first traffic and a start of reading of a next data block in the first traffic; and
a sending unit that sends the interval controlled by the control unit to the second node, and
the second node comprises:
a third queue that stores the data blocks of the first traffic;
a receiving unit that receives the interval from the first node; and
a reading unit that reads data blocks out of the third queue such that a data block interval of the first traffic is equal to or larger than the interval received by the receiving unit.

9. The communication system according to claim 8, wherein
the first node further comprises a monitoring unit that monitors for occurrence of data blocks read out of the second queue after reading of one data block of the first traffic from the first queue is completed, and
when occurrence frequency of the data blocks read out of the second queue after the reading of a data block from the first queue is completed is equal to or higher than a predetermined value, the control unit sets a predetermined interval between data blocks of the first traffic.

10. The communication system according to claim 9, wherein
when the occurrence frequency becomes lower than a second predetermined value, the control unit resets the interval, and
the sending unit sends the reset of the interval to the second node.

11. The communication system according to claim 8, wherein
the control unit controls an upper limit size of the data blocks stored in the first queue,
the sending unit sends the upper limit size to the second node,
the receiving unit of the second node receives the upper limit size, and
the second node further comprises a dividing unit that divides the data blocks stored in the third queue so as to be of a size smaller than the upper limit size received by the receiving unit.

12. The communication system according to claim 8, wherein
the first node further comprises an estimation unit that estimates timing of reception of the data blocks stored in the first queue, the sending unit sends the timing estimated by the estimation unit to the second node together with the interval, the receiving unit of the second node receives the timing together with the interval, the reading unit reads the data blocks out of the third queue such that the interval is set to the timing received by the receiving unit.

13. A data block output method comprising:

storing data blocks of first traffic in a first queue;

storing data blocks of second traffic in a second queue read preferentially over the first queue, controlling by a control unit a data block interval between completion of reading of one data block in the first traffic and a start of reading of a next data block in the first traffic; and sending the interval controlled by the control unit to an apparatus located upstream along the first traffic.

14. A communication method performed on a communication system that comprises: a first node; and a second node located upstream along first traffic, comprising:

the first node storing data blocks of the first traffic in a first queue;

storing data blocks of second traffic in a second queue read preferentially over the first queue;

controlling a data block interval between completion of reading of one data block in the first traffic and a start of reading of a next data block in the first traffic; and sending the controlled interval to the second node; and the second node storing the data blocks of the first traffic in a third queue;

receiving the interval from the first node; and reading data blocks out of the third queue such that a data block interval of the first traffic will be equal to or larger than the received interval.

\* \* \* \* \*